United States Patent
Kerr et al.

(10) Patent No.: US 10,430,492 B1
(45) Date of Patent: *Oct. 1, 2019

(54) SYSTEM AND METHOD FOR HANDSET POSITIONING WITH DYNAMICALLY UPDATED RF FINGERPRINTING

(75) Inventors: Michael A. Kerr, Reno, NV (US); David Stewart, Stateline, NV (US)

(73) Assignee: NEXRF, CORP., Reno, NV (US)

(*) Notice: Subject to any disclaimer, the term of this patent is extended or adjusted under 35 U.S.C. 154(b) by 1119 days.

This patent is subject to a terminal disclaimer.

(21) Appl. No.: 13/218,256

(22) Filed: Aug. 25, 2011

Related U.S. Application Data

(63) Continuation-in-part of application No. 13/153,214, filed on Jun. 3, 2011, now Pat. No. 9,507,494, which is a continuation-in-part of application No. 13/153,238, filed on Jun. 3, 2011, now Pat. No. 9,408,032, which is a continuation-in-part of application No. 13/153,248, filed on Jun. 3, 2011, now Pat. No. 9,615,347, which is a continuation-in-part of application No. 12/821,852,
(Continued)

(51) Int. Cl.
*A63F 9/24* (2006.01)
*G06F 17/00* (2019.01)

(52) U.S. Cl.
CPC .................... *G06F 17/00* (2013.01)

(58) Field of Classification Search
USPC ...................................... 463/30, 35, 40, 42
See application file for complete search history.

(56) References Cited

U.S. PATENT DOCUMENTS

| | | |
|---|---|---|
| 4,339,798 A | 7/1982 | Hedges et al. |
| 4,856,787 A | 8/1989 | Itkis |

(Continued)

FOREIGN PATENT DOCUMENTS

| | | |
|---|---|---|
| JP | 2009025019 A | 2/2009 |
| WO | 2008065257 A1 | 6/2008 |
| WO | WO2008065257 A1 | 6/2008 |

OTHER PUBLICATIONS

Wirelss Network. Wikipedia. http://en.wikipedia.org/wiki/Wireless_network. Nov. 17, 2008.
(Continued)

*Primary Examiner* — Paul A D'Agostino
(74) *Attorney, Agent, or Firm* — Kerr IP Group, LLC

(57) ABSTRACT

A system and method for determining the location of a wireless handset on a premises is described. The system comprises a plurality of beacons and a plurality of sensors associated with the premises. The sensors are configured to detect a radio frequency signal comprising a signal identifier from the beacons. A plurality of virtual reference point fingerprints are generated based on the beacon signal strengths detected by the sensors. The virtual reference points comprise signal strengths for each of the plurality of beacons estimated at intervals throughout the premises. The system further comprises a wireless handset configured to receive a handset fingerprint comprising a signal identifier and a signal strength from the beacons. The location of the wireless handset is determined based on a comparison between the handset fingerprint signal strengths and the signal strengths of a subset of the virtual reference point fingerprints.

21 Claims, 19 Drawing Sheets

Related U.S. Application Data filed on Jun. 23, 2010, now Pat. No. 8,738,024, which is a continuation-in-part of application No. 12/413,547, filed on Mar. 28, 2009, now Pat. No. 8,942,995, which is a continuation-in-part of application No. 11/948,007, filed on Nov. 30, 2007.

(60) Provisional application No. 61/376,936, filed on Aug. 25, 2010, provisional application No. 61/351,677, filed on Jun. 4, 2010, provisional application No. 61/351,770, filed on Jun. 4, 2010, provisional application No. 61/352,242, filed on Jun. 7, 2010, provisional application No. 61/223,565, filed on Jul. 7, 2009, provisional application No. 61/040,661, filed on Mar. 29, 2008, provisional application No. 60/872,351, filed on Nov. 30, 2006.

(56) References Cited

U.S. PATENT DOCUMENTS

| | | |
|---|---|---|
| 5,586,937 A | 12/1996 | Menashe |
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,800,268 A | 9/1998 | Molnick |
| 5,851,149 A | 12/1998 | Xidos et al. |
| 5,871,398 A | 2/1999 | Schneier et al. |
| 5,902,983 A | 5/1999 | Crevalt et al. |
| 5,947,821 A | 9/1999 | Stone |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 * | 8/2003 | Arpee et al. ............... 455/422.1 |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 | 1/2004 | Rowe |
| 6,682,421 B1 | 1/2004 | Rowe et al. |
| 6,702,672 B1 | 3/2004 | Angell et al. |
| 6,709,333 B1 | 3/2004 | Bradford |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Rasanen et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,506,406 B2 | 8/2013 | Kerr |
| 8,506,407 B2 | 8/2013 | Kerr |
| 8,523,679 B2 | 9/2013 | Kerr |
| 8,738,024 B1 * | 5/2014 | Kerr et al. ............... 342/458 |
| 8,747,229 B2 | 6/2014 | Kerr |
| 8,942,995 B1 | 1/2015 | Kerr |
| 9,043,222 B1 | 5/2015 | Kerr et al. |
| 2001/0004768 A1 | 6/2001 | Hodge et al. |
| 2001/0005908 A1 | 6/2001 | Hodge et al. |
| 2001/0036224 A1 | 11/2001 | Demello et al. |
| 2001/0039210 A1 | 11/2001 | ST-Denis |
| 2001/0044337 A1 | 11/2001 | Rowe et al. |
| 2002/0002073 A1 | 1/2002 | Montgomery et al. |
| 2002/0007494 A1 | 2/2002 | Hodge |
| 2002/0056125 A1 | 5/2002 | Hodge et al. |
| 2002/0056143 A1 | 5/2002 | Hodge et al. |
| 2002/0069105 A1 | 6/2002 | Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 | 12/2002 | Ryan |
| 2003/0009385 A1 | 1/2003 | Tucciarone et al. |
| 2003/0030666 A1 | 2/2003 | Najmi et al. |
| 2003/0032409 A1 | 2/2003 | Hutcheson et al. |
| 2003/0064805 A1 | 4/2003 | Wells |
| 2003/0119578 A1 | 6/2003 | Newson |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0085257 A1 | 4/2005 | Laird et al. |
| 2005/0114212 A1 | 5/2005 | Carrez et al. |
| 2005/0136949 A1 | 6/2005 | Barnes |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0246334 A1 * | 11/2005 | Tao et al. ............... 707/5 |
| 2005/0261063 A1 | 11/2005 | Boyd et al. |
| 2006/0003830 A1 | 1/2006 | Walker et al. |
| 2006/0004627 A1 | 1/2006 | Baluja |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |

(56) References Cited

U.S. PATENT DOCUMENTS

| | | | |
|---|---|---|---|
| 2006/0238382 A1 | 10/2006 | Kimchi et al. | |
| 2006/0240891 A1 | 10/2006 | Klinkhammer et al. | |
| 2006/0287810 A1 | 12/2006 | Sadri et al. | |
| 2007/0008108 A1 | 1/2007 | Schurig et al. | |
| 2007/0024580 A1 | 2/2007 | Sands et al. | |
| 2007/0025265 A1* | 2/2007 | Porras et al. | 370/252 |
| 2007/0060306 A1 | 3/2007 | Amaitis et al. | |
| 2007/0061229 A1 | 3/2007 | Ramer et al. | |
| 2007/0087834 A1 | 4/2007 | Moser et al. | |
| 2007/0100963 A1 | 5/2007 | Ban et al. | |
| 2007/0136132 A1 | 6/2007 | Weiser et al. | |
| 2007/0149215 A1 | 6/2007 | Misikangas | |
| 2007/0149216 A1 | 6/2007 | Misikangas | |
| 2007/0167210 A1 | 7/2007 | Kelly et al. | |
| 2007/0168127 A1 | 7/2007 | Zaruba et al. | |
| 2007/0184852 A1 | 8/2007 | Johnson et al. | |
| 2007/0218975 A1 | 9/2007 | Iddings et al. | |
| 2007/0243925 A1 | 10/2007 | LeMay et al. | |
| 2007/0244633 A1 | 10/2007 | Phillips et al. | |
| 2007/0257831 A1 | 11/2007 | Mathews et al. | |
| 2007/0270212 A1 | 11/2007 | Cockerille et al. | |
| 2007/0281692 A1 | 12/2007 | Bucher et al. | |
| 2008/0026844 A1 | 1/2008 | Wells | |
| 2008/0032705 A1 | 2/2008 | Patel et al. | |
| 2008/0039192 A1 | 2/2008 | Laut | |
| 2008/0057894 A1 | 3/2008 | Aleksic et al. | |
| 2008/0076572 A1 | 3/2008 | Nguyen et al. | |
| 2008/0085692 A1 | 4/2008 | Hart et al. | |
| 2008/0096659 A1 | 4/2008 | Kreloff et al. | |
| 2008/0097858 A1 | 4/2008 | Vucina et al. | |
| 2008/0102947 A1 | 5/2008 | Hays et al. | |
| 2008/0108430 A1 | 5/2008 | Evans | |
| 2008/0113785 A1 | 5/2008 | Alderucci et al. | |
| 2008/0153515 A1* | 6/2008 | Mock et al. | 455/456.5 |
| 2008/0162037 A1 | 7/2008 | Hasan Mahmoud | |
| 2008/0166973 A1 | 7/2008 | Hart et al. | |
| 2008/0167106 A1 | 7/2008 | Lutnick et al. | |
| 2008/0186234 A1 | 7/2008 | Alles et al. | |
| 2008/0189360 A1 | 8/2008 | Kiley et al. | |
| 2008/0207296 A1* | 8/2008 | Lutnick et al. | 463/16 |
| 2008/0227473 A1 | 9/2008 | Haney | |
| 2008/0249833 A1 | 10/2008 | Ali et al. | |
| 2008/0252527 A1 | 10/2008 | Garcia | |
| 2008/0281668 A1 | 11/2008 | Nurminen | |
| 2009/0018929 A1 | 1/2009 | Weathers | |
| 2009/0150217 A1 | 6/2009 | Luff | |
| 2009/0197684 A1 | 8/2009 | Arezina et al. | |
| 2009/0213771 A1 | 8/2009 | Celentano et al. | |
| 2009/0214036 A1 | 8/2009 | Shen et al. | |
| 2009/0298513 A1 | 12/2009 | Hampel et al. | |
| 2010/0022308 A1 | 1/2010 | Hartmann et al. | |
| 2010/0027521 A1 | 2/2010 | Huber et al. | |
| 2010/0039929 A1 | 2/2010 | Cho et al. | |
| 2010/0048242 A1 | 2/2010 | Rhoads et al. | |
| 2010/0121567 A1 | 5/2010 | Mendelson | |
| 2010/0167771 A1 | 7/2010 | Raghothaman et al. | |
| 2010/0179885 A1 | 7/2010 | Fiorentino | |
| 2010/0280960 A1 | 11/2010 | Ziotopoulos et al. | |
| 2010/0287033 A1 | 11/2010 | Mathur | |
| 2010/0302056 A1 | 12/2010 | Dutton et al. | |
| 2010/0305855 A1 | 12/2010 | Dutton et al. | |
| 2010/0331016 A1 | 12/2010 | Dutton et al. | |
| 2011/0078167 A1 | 3/2011 | Sundaresan et al. | |
| 2011/0103360 A1 | 5/2011 | Ku et al. | |
| 2012/0115512 A1 | 5/2012 | Grainger et al. | |
| 2012/0122476 A1 | 5/2012 | Lee et al. | |
| 2013/0003572 A1 | 1/2013 | Kim et al. | |

OTHER PUBLICATIONS

"Tracking Cookie." Wikipedia. http://en.wikipedia.org/wiki/Tracking_cookie. May 24, 2009.
Blom et al. "Transmission Power Measurements for Wireless Sensor Nodes and their Relationship to Battery Level." Symposium on Wireless Communication Systems. pp. 342-345, Sep. 7, 2005.
"Wi-Fi Location-Based Services—Design and Deployment Considerations." 2006 Cisco Systems. Accessed Dec. 2008. https://learningnetwork.cisco.com/docs/DOC-3418.
"Location in SIP/IP Core Architecture." Open Mobile Alliance. Sep. 4, 2008. Accessed Dec. 2008. http://www.openmobilealliance.org/technical/release_program/locsip_archive.aspx.
Want et al. "The Active Badge Location System." ACM Transactions on Office Information Systems (TOIS) vol. 10. No. 1, pp. 91-102, Jan. 1992.
Youssef et al. "Location-Clustering Techniques for Wlan Location Determination Systems." 2006. http://wrc.ejust.edu.eg/papers/ijca.pdf.
Vegni et al. "Local Positioning Services on IEEE 802.11 Networks." Radio Engineering, pp. 42-47, vol. 17, No. 2, Jun. 2008.
Ladd et al. "On the Feasibility of Using Wireless Ethernet for Indoor Localization." IEEE Transactions on Robotics and Automation, pp. 555-559, vol. 20, Issue 3, No. 3, Jun. 2004.
Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminals-using-rssi-between-terminals/330959.
Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.
Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.
Li et al. "A New Method for Yielding a Database of Location Fingerprints in WLAN" IEE Communications Proceedings, pp. 580-586, vol. 152, Issue 5, Oct. 7, 2005.
Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.
Muthukrishnan, et al. "Sensing motion using spectral and spatial analysis of WLAN RSSI." Proceedings of the 2nd European conference on Smart sensing and context. 2007. pp. 62-76.
Capkun et al. "Mobility Helps Peer-to-Peer Security." IEEE Transactions on Mobile Computing. vol. 5, Issue 1, pp. 43-51, Jan. 2006.
Milojicic et al. "Peer-to-Peer Computing" Jul. 10, 2002. https://www.hpl.hp.com/techreports/2002/HPL-2002-57R1.pdf.
"The New Normal of Retailing: The Rise of the Mobile Shopper." Next Generation Retail Summit. 2010. http://www.ngrsummit.com/media/whitepapers/Microsoft_NGRUS.pdf.
Lamarca et al. "Place Lab: Positioning Using Radio Beacons in the Wild." Pervasive 2005, LNCS 3468, pp. 116-133, 2005.
Borriello et al. "Delivering Real-World Ubiquitous Location Systems." Communications of the ACM. pp. 36-41, vol. 48, Issue 3, Mar. 2005.
Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.
Hightower et al. "Practical Lessons from the Place Lab." IEEE Pervasive Computing. pp. 32-39, vol. 5, Issue 3, Jul.-Sep. 2006.
Hile et al. "Indoor Location Estimation with Placelab." http://www.cs.washington.edu/education/courses/cse590gb/04wi/projects/hile-liu/. Jan. 8, 2004. Accessed on Sep. 25, 2008.
Kang "Extracting Places from Traces of Locations." ACM SIGMOBILE Mobile Computing and Communications Review. vol. 9, Issue 3, Jul. 2005.
Lamarca et al. "Self-Mapping in 802.11 Location Systems." UbiComp 2005: Ubiquitous Computing Lecture Notes in Computer Science, 2005, vol. 3660/2005, 903, DOI: 10.1007111551201_6.
Otsason et al. "Accurate GSM Indoor Localization." Ubiquitous Computing 2005, LNCS 3660, pp. 141-158, 2005.
Varshavsky et al. "Are GSM Phones THE Solution for Localization?" 7th IEEE Workshop on Mobile Computing Systems and Applications, 2006. pp. 34-42, Aug. 1, 2005.

(56) References Cited

OTHER PUBLICATIONS

Chawathe et al. "A Case Study in Building Layered DHT Applications." Proceedings of the 2005 conference on Applications, technologies, architectures, and protocols for computer communications. vol. 35, Issue 4, Oct. 2005.

Lamarca et al. "Finding Yourself: Experimental location technology relies on Wi-Fi and cellphone signals instead of orbiting satellites." Dec. 2004. http://spectrum.ieee.org/computing/networks/finding-yourself.

Letchner et al. "Large-Scale Localization from Wireless Signal Strength." In Proceedings of the National Conference on Artificial Intelligence (AAAI), 2005.

Welbourne et al. "Mobile Context Inference Using Low-Cost Sensors." Location and Context-Awareness Lecture Notes in Computer Science, 2005, vol. 3479/2005, pp. 95-127.

Balakrishnan et al. "Lessons from Developing and Deploying the Cricket Indoor Location System." Nov. 7, 2003. http://www.sds.lcs.mit.edu/projects/cricket/V1Exp.pdf.

Cheng et al. "Accuracy Characterization for Metropolitan-scale Wi-Fi Localization." Proceedings of the 3rd international conference on Mobile systems, applications, and services. 2005.

"Ekahau Positioning Engine 4.2." 2008. http://www.nowire.se/images/produktblad/ekahau/datasheet_epe_42_en_11022008_lo.pdf. Sep. 29, 2008.

USPTO, Notice of Allowance of U.S. Appl. No. 12/821,852, dated Jan. 8, 2014, p. 7-8.

"Internet Industry Interacting Gambling Code: A Code for Industry Co-Regulation in the Area of Internet Gambling Content Pursuant to the Requirements of the Interactive Gambling Act 2001." Internet Industry Association. Dec. 2001.

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.

"Wireless Network." Wikipedia. http://en.wikipedia.org/wiki/Wireless.sub.--network. Nov. 17, 2008.

Chen et al. "Practical Metropolitan-Scale Positioning for GSM Phone." UbiComp 2006: Ubiquitous Computing Lecture Notes in Computer Science, 2006, vol. 4206/2006, pp. 225-242.

HTTP Cookie, redirected from tracking cookie as downloaded from wikipedia, 41 pages.

Interactive Gambling Industry Code, Dec. 2001, 7 pages.

Ladd et al. "Using Wireless Ethernet for Localization." IEEE/RJS International Conference on Intelligent Robots and Systems. 2002.

Lafargue, Edouard. "Wireless Network Audits using Open Source Tools". SANS Institute 2003. Accessed Dec. 2008. http://www.sans.org/reading.sub.--room/whitepapers/auditing/wireless-netw- ork-audits-open-source-tools.sub.--1235.

Lamarca et al. "Self-Mapping in 802.11 Location Systems." UbiComp 2005: Ubiquitous Computing Lecture Notes in Computer Science, 2005, vol. 3660/2005, 903, DOI: 10.1007/11551201.sub.--6.

Wireless Network as downloaded from wikipedia.com, pages. 5 pages.

\* cited by examiner

| Sensor 1 Fingerprint | |
|---|---|
| Beacon 1 | -25 dB |
| Beacon 2 | - 40 dB |

| Sensor 2 Fingerprint | |
|---|---|
| Beacon 1 | -30 dB |
| Beacon 2 | - 35 dB |

Figure 2

| Virtual Reference Point ||
|---|---|
| Longitude | 39.967960 |
| Latitude | -128.884100 |
| Beacon 1 | -33 dB |
| Beacon 2 | - 37 dB |

Figure 6

| User Attribute | |
|---|---|
| User ID | 12345678 |
| Attribute ID | 11111111 |
| Attribute Category | Pet |
| Attribute Value | Dog |

| Attribute Groups | |
|---|---|
| User ID | 12345678 |
| Attribute Group ID | 11111111 |

1300

Associate Content with User Group Attributes

Content Item: Dog Food ▼ — 1302
- Cat Food
- Dog Food
- Fish Tank Supplies
- Grooming Services User Attribute Type: Pet ▼ — 1304
- Age
- Gender
- Pet User Attribute Value: Deg ▼ — 1306
- Cat
- Chinchilla
- Dog Level: 1 ▼ — 1308
- 1
- 2
- 3

Relevance Weighting: 90 — 1310

Associate Content with User Group Attributes

Content Item — Puppy Chow Coupon ▼ —1352
- Happy Dog Chew Toy Coupon
- Leashes
- Pet Owner Manual
- Puppy Chow Coupon User Attribute Type — Pet ▼ —1354
- Age
- Gender
- Pet User Attribute Value — Dog ▼ —1356
- Cat
- Chinchilla
- Dog Level — 2 —1360

Parent Content Item — Dog Food ▼ —1362
- Dog Food
- Fish Tank Supplies
- Grooming Services Relevance Weighting — 80 —1358

Figure 13B

SYSTEM AND METHOD FOR HANDSET POSITIONING WITH DYNAMICALLY UPDATED RF FINGERPRINTING

CROSS-REFERENCE

This patent application claims the benefit of provisional patent application 61/376,936 entitled SYSTEM AND METHOD FOR HANDSET POSITIONING WITH DYNAMICALLY UPDATED WI-FI FINGERPRINTING filed on Aug. 25, 2010;

this patent application is a continuation-in-part of patent application Ser. No. 13/153,214 entitled MERCHANT CONTROLLED PLATFORM SYSTEM AND METHOD filed on Jun. 3, 2011 now U.S. Pat. No. 9,507,494 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 13/153,238 entitled MERCHANT CONTROL PLATFORM SYSTEM AND METHOD WITH LOCATION-BASED CONTENT DELIVERY filed on Jun. 3, 2011 now U.S. Pat. No. 9,408,032 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application of patent application Ser. No. 13/153,248 entitled LOCATION POSITIONING ENGINE SYSTEM AND METHOD filed on Jun. 3, 2011 now U.S. Pat. No. 9,615,347 that claims the benefit of the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 12/821,852 entitled MOBILE AUTONOMOUS DYNAMIC GRAPHICAL USER INTERFACE APPLICATION FRAMEWORK filed on Jun. 23, 2010 now U.S. Pat. No. 8,738,024 that claims the benefit of provisional patent application 61/223,565 filed on Jul. 7, 2009;

this patent application is a continuation-in-part of patent application Ser. No. 12/413,547 entitled MOBILE AUTONOMOUS DYNAMIC GRAPHICAL USER INTERFACE filed on Mar. 28, 2009 now U.S. Pat. No. 8,942,995 that claims the benefit of provisional patent application 61/040,661 filed on Mar. 29, 2008;

this patent application is a continuation-in-part of patent application Ser. No. 11/948,007 titled PLAYER TRACKING USING A WIRELESS DEVICE FOR A CASINO PROPERTY filed on Nov. 30, 2007 that claims the benefit of provisional patent application 60/872,351 titled filed on Nov. 30, 2006; and The above patent applications are hereby incorporated by reference in this patent application.

FIELD

The present invention relates to the determination of the position of a wireless handset using a radio frequency network. More particularly, the present invention relates to a system and method for comparing a radio frequency signal fingerprint received at a handset against a subset of predetermined signal fingerprints to determine the position of a wireless handset.

BACKGROUND

Various systems exist for determining the position of a wireless handset using wi-fi technology. Position determination to an accuracy of 10-20 meters has been accomplished using a database of known wi-fi access points.

Higher accuracies have been accomplished using measured or calculated geocoded reference data in conjunction with wi-fi access points. A wireless handset detects signals from various access points and the handset location is determined by comparing the received signal strength profile ("fingerprint") with a database of geocoded wi-fi data. The location of the handset has been determined by comparing the fingerprint received at the handset against a set of reference points using various algorithms. However, in such a system, if an access point is moved or removed, the reference points are no longer indicative of the signal strength profile that will be received at a wireless handset.

Thus, there is a need for a system capable of dynamically responding to changes in the distribution of radio frequency beacons throughout a space.

The wireless handset presents new opportunities for the Enterprise to communicate with users. For example, merchants have new opportunities to communicate with customers. The merchant may wish to provide information to the customer regarding a product or service, offer incentives to the customer to enter a premises or make a purchase, or provide services that utilize the capabilities of the wireless handset.

SUMMARY

A system for determining the location of a wireless handset on a premises is described. The system comprises a plurality of beacons and a plurality of sensors associated with the premises. Each of the beacons is configured to transmit a radio frequency signal comprising a signal identifier. Each of the sensors is configured to receive a sensor fingerprint comprising a signal identifier and signal strength for each beacon detectable by the sensor. The system further comprises a server communicatively coupled to a network. The server is configured to determine the location of each beacon and each sensor. The server is further configured to generate a plurality of virtual reference point fingerprints based on sensor fingerprints received from the sensors. Each virtual reference point comprises a signal identifier and signal strength for each of the plurality of beacons associated with the premises. The system further comprises a wireless handset configured to receive a handset fingerprint comprising a signal identifier and a signal strength from each beacon detectable by the wireless handset. The location of the wireless handset is determined based on a comparison between the handset fingerprint signal strengths and the signal strengths of a subset of the virtual reference point fingerprints.

In another embodiment, the system comprises a means for generating a plurality of virtual reference point fingerprints based on sensor fingerprints received from the sensors.

A method for determining the location of a wireless handset on a premises is also described. The method comprises determining the location of the plurality of beacons and sensors associated with the premises. The method further comprises generating a plurality of virtual reference point fingerprints based on sensor fingerprints received from the sensors. Each virtual reference point comprises a signal identifier and signal strength for each of the plurality of beacons associated with the premises. The method further comprises determining the location of the wireless handset based on a comparison between the handset fingerprint signal strengths and the signal strengths of a subset of the virtual reference point fingerprints.

FIGURES

The present invention will be more fully understood by reference to the following drawings which are for illustrative, not limiting, purposes.

FIG. 2 shows illustrative sensor fingerprints.

FIG. 6 shows an illustrative virtual reference point.

FIGS. 13A-13B show an illustrative content administrator interface for creating content connections.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A system for determining the location of a wireless handset within a premises is described. A plurality of radio frequency (RF) beacons and RF sensors are associated with a premises. Each of the sensors detects a fingerprint comprising the signal strength and identity of the signals emitted by each of the beacons. Measured reference points, such as the fingerprints detected by the sensors, are used to generate fingerprints at various points ("virtual reference points") throughout the premises. Measured reference points may also include fingerprints determined via a site survey performed on the premises or other means for measuring received signal strength indication (RSSI) data for beacons associated with the premises. If the RF signal profile in the premises changes (due to, e.g., a beacon ceasing to emit a signal, a beacon being moved, or a signal-affecting obstruction being placed in the vicinity of the beacon), the sensors are capable of detecting a new fingerprint indicating the altered signal profile. A new set of virtual reference points may be generated based on the new fingerprints.

A wireless handset detects an RF signal fingerprint from the beacons. The fingerprint received at the handset is compared to a selection of all or a subset of the virtual reference point fingerprints. The proximity of the handset to each of the selected virtual reference points is determined. The handset may be determined to be at the location of the nearest reference point or at a location between two or more reference points that are nearest to the handset, using an algorithm described below.

Figure 1A:
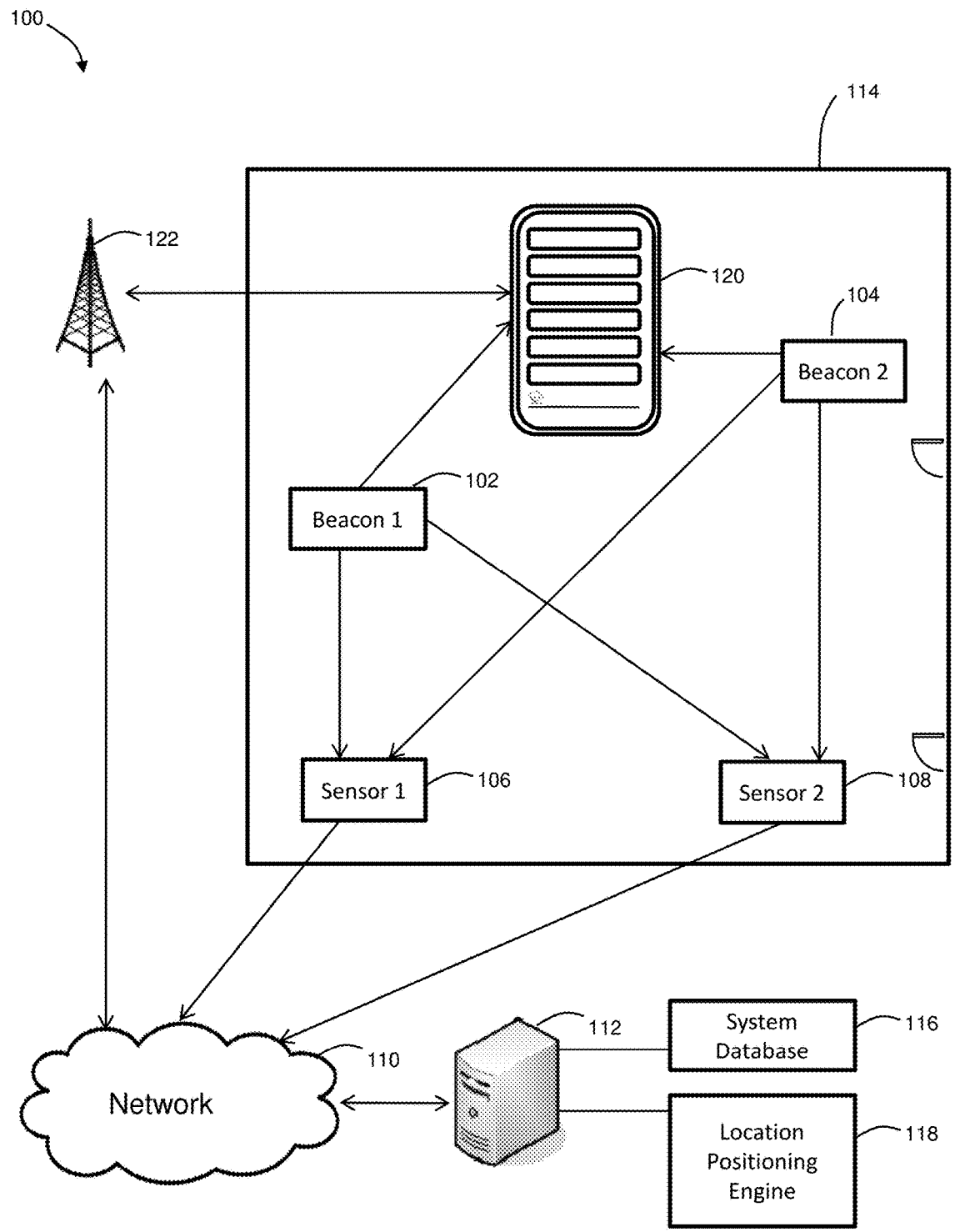
FIG. 1A shows an illustrative system architecture for a handset position detection system.

Referring to FIG. 1A, an illustrative system architecture for a handset position detection system is shown. The system architecture 100 comprises a plurality of beacons, shown at 102 and 104; a plurality of sensors, shown at 106 and 108; a network 110; and a server 112. The beacons and sensors are shown located within premises 114.

A beacon is an RF signal transmitter, such as a wireless access point or a femtocell. A wireless access point (WAP) is a device that allows communication devices to connect to a wireless network using Wi-Fi, Bluetooth, and other wireless standards. The WAP usually connects to the wireless network via a router. A femtocell is a cellular base station that connects to a service provider's network via broadband, e.g. DSL or cable. A femtocell allows service providers to extend service coverage indoors, especially where access would otherwise be limited or unavailable. The femtocell may provide access to wireless devices using wireless standards such as WCDMA, GSM, CDMA2000, TD-SCDMA, WiMAX and LTE. The signal transmitted by each beacon comprises a signal identifier that uniquely identifies the beacon. The signal identifier may change, periodically or in response to user direction, to increase system security.

Each sensor is configured to detect a signal from each beacon in range of the sensor. A beacon "in range" of the sensor may be any beacon from which the sensor is able to detect a signal. Alternatively, the beacons in range of the sensor may be all beacons from which the handset received a signal over a threshold signal level. Sensor 106 detects a signal from beacon 102 and beacon 104. Sensor 108 likewise detects signals from beacons 102 and 104. The sensors transmit the signal identification and signal strength of each detected signal to server 112 via network 110. A sensor fingerprint comprises the signal identification and signal strength of each signal detected by a sensor. Server 112 comprises system database 116 and a handset position detection application 118. The sensor fingerprint is stored in system database 116. The handset position detection application 118 generates a set of virtual reference points based on the sensor fingerprint as described below.

The sensors may transmit the sensor fingerprints to the server on a periodic basis, for example, on an hourly, daily or monthly basis. In some embodiments, the sensors are configured to automatically transmit the sensor fingerprints. In other embodiments, the sensor fingerprints are transmitted to the server in response to a request by a system user. The system user may place the request, for example, through an interface with an application capable of sending a command to the sensor to transmit a sensor fingerprint to the server.

Wireless handset 120 is communicatively coupled to network 110 via antenna 122. Wireless handset 120 may be a mobile handset, mobile phone, wireless phone, portable cell phone, cellular phone, portable phone, a personal digital assistant (PDA), a tablet, a portable media device or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network, WLAN, Wi-Fi or WiMAX. It shall be appreciated by those of ordinary skill in the art that the terms wireless handset, mobile handset, wireless phone, and mobile phone are interchangeable. Antenna 122 may be one of a plurality of base station antennas associated with a cellular phone network, or an antenna associated with a wireless local area network access point, and may use Wi-Fi or WiMAX, or other such networking protocols. Network 110 may be a local area network ("LAN"), wide area network ("WAN") or any other network used to facilitate communication among computers and wireless communication devices.

As wireless handset 120 moves through or proximate to premises 114, it detects signals from the beacons in range of the handset. The handset may detect beacon signals on a periodic basis. Alternatively, the handset may detect beacon signals in response to user activity, such as a user request to determine handset location entered using a handset interface. In other embodiments, the handset may detect beacon signals periodically while an application that uses premises position detection is running on the handset.

The wireless handset 120 transmits to the server 112 via network 110 information regarding the signals the handset received from the beacons in range of the handset. A handset fingerprint comprises the signal identification and signal strength of each beacon in range of the handset. The beacons in range of the handset may be all beacons detectable by the handset. Alternatively, the beacons in range of the handset may be all beacons from which the handset received a signal over a threshold signal level. A handset fingerprint is transmitted to server 112 and stored in system database 116. Server 112 also comprises location positioning engine (LPE) 118, an application for determining the position of the handset based on the handset fingerprint and a plurality of virtual reference points as described below. In alternative embodiments, the LPE runs on a wireless handset or on a remote server.

Figure 1B:
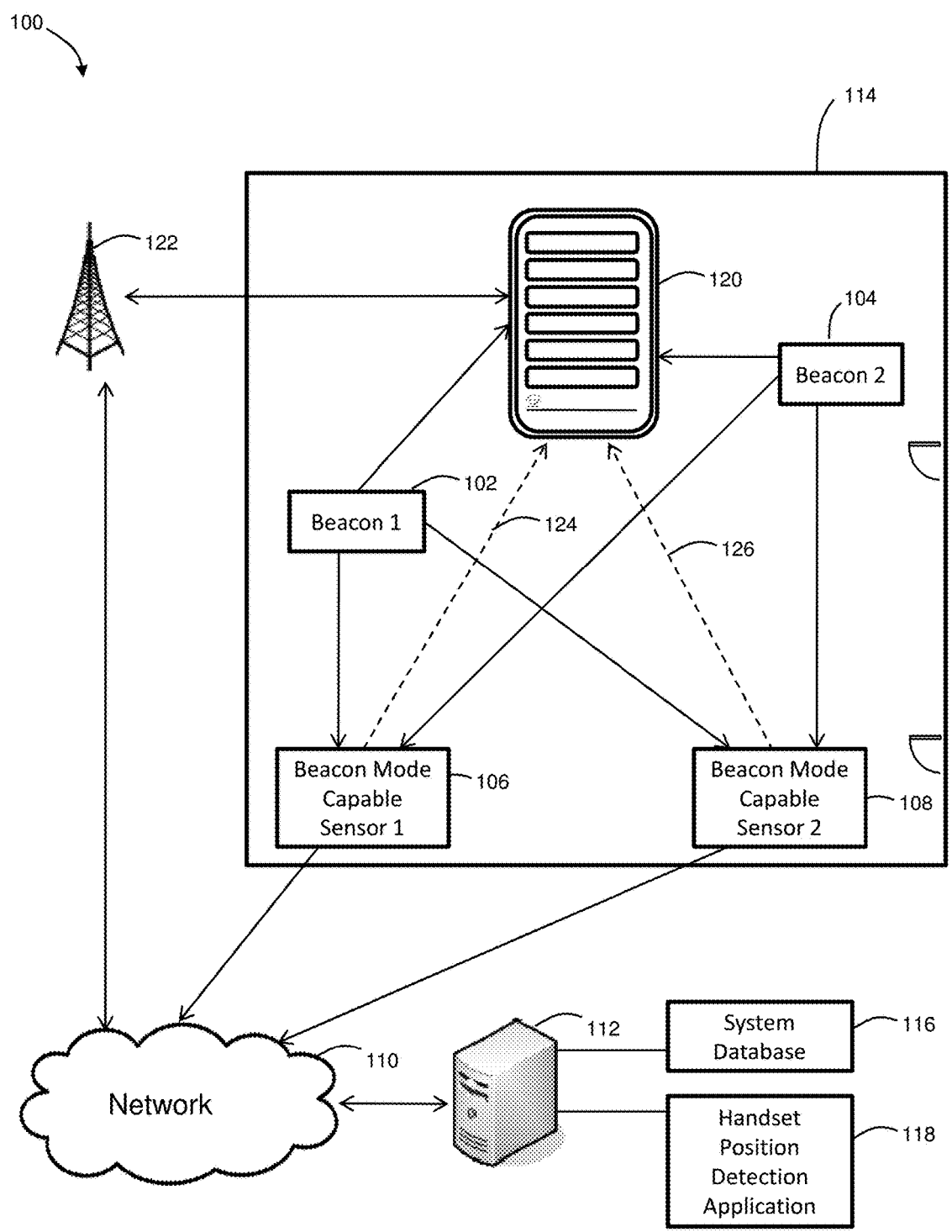
FIG. 1B shows an illustrative system architecture for a handset position detection system with sensors capable of operating in beacon mode.

Referring to FIG. 1B, an illustrative system architecture for a handset position detection system with sensors capable of operating in beacon mode is shown. In some embodiments, one or more sensors are devices having a beacon mode in which the sensors are capable of transmitting signals. The sensors may operate in sensing mode and beacon mode simultaneously, or may alternate between modes. In some embodiments, the sensors are configured to periodically switch between sensing mode and beacon mode. The sensors may switch between sensing mode and beacon mode in response to a command provided via the network from a user interface. In some embodiments, the switch between sensing mode and beacon mode may be triggered by other sensor inputs or feedback, e.g. temperature, humidity, number of people, number of RF radiators, and other such variables affecting or causing changes to the RF environment. The wireless handset 120 may detect a signal from sensors operating in beacon mode, as indicated by the dotted-line arrows at 124 and 126.

In the embodiments illustrated in FIGS. 1A-1B, the sensors operate as nodes in a mesh network, with each sensor capable of communicating with server 112 via network 110. In an alternative embodiment, the sensors act as nodes in an ad hoc network, wherein one or more nodes is configured to forward data to another node, communicating with the network indirectly through the other node. Other network objects, such as beacons and beacon mode enabled sensors, may also perform as nodes in either the mesh network or ad hoc network embodiments.

Referring to FIG. 2, illustrative sensor fingerprints are shown. The fingerprints shown at 200 and 202 are presented as examples of the information a fingerprint may comprise and are not intended to be limiting. The fingerprints of FIG. 2 correspond to the sensors and beacons shown in FIG. 1A. Sensor 1 Fingerprint 200 indicates that Sensor 1 received a signal having a strength of −35 dB from Beacon 1 and a signal having a strength of −40 dB from Beacon 2. Sensor 2 Fingerprint 202 indicates that Sensor 2 received a signal having a strength of −30 dB from Beacon 1 and a signal having a strength of −35 dB from Beacon 2. Sensor fingerprints 200 and 202 may be transmitted from the sensors to server 112 and stored in system database 116.

Figure 3:
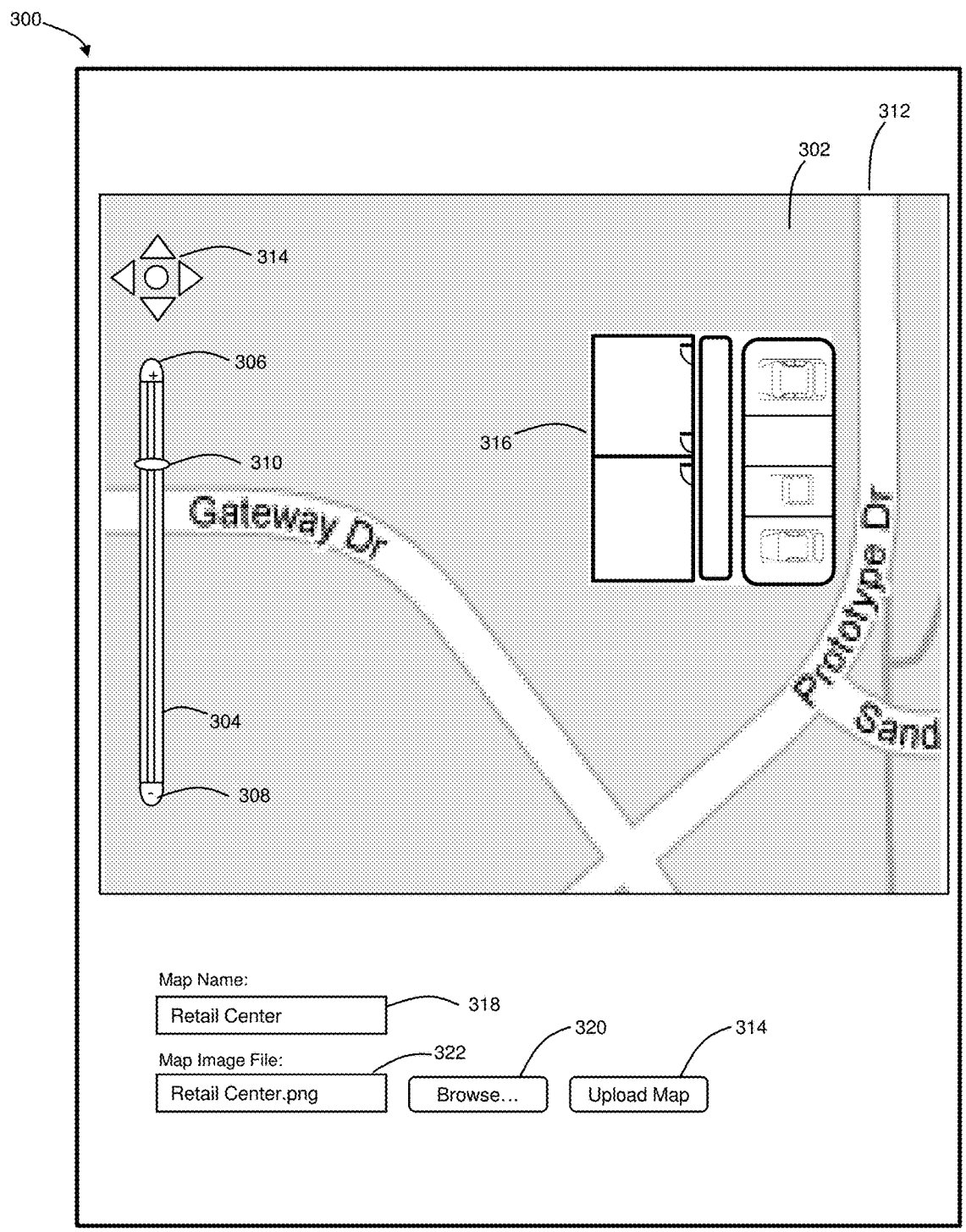
FIG. 3 shows an illustrative GIS interface.
Figure 4:
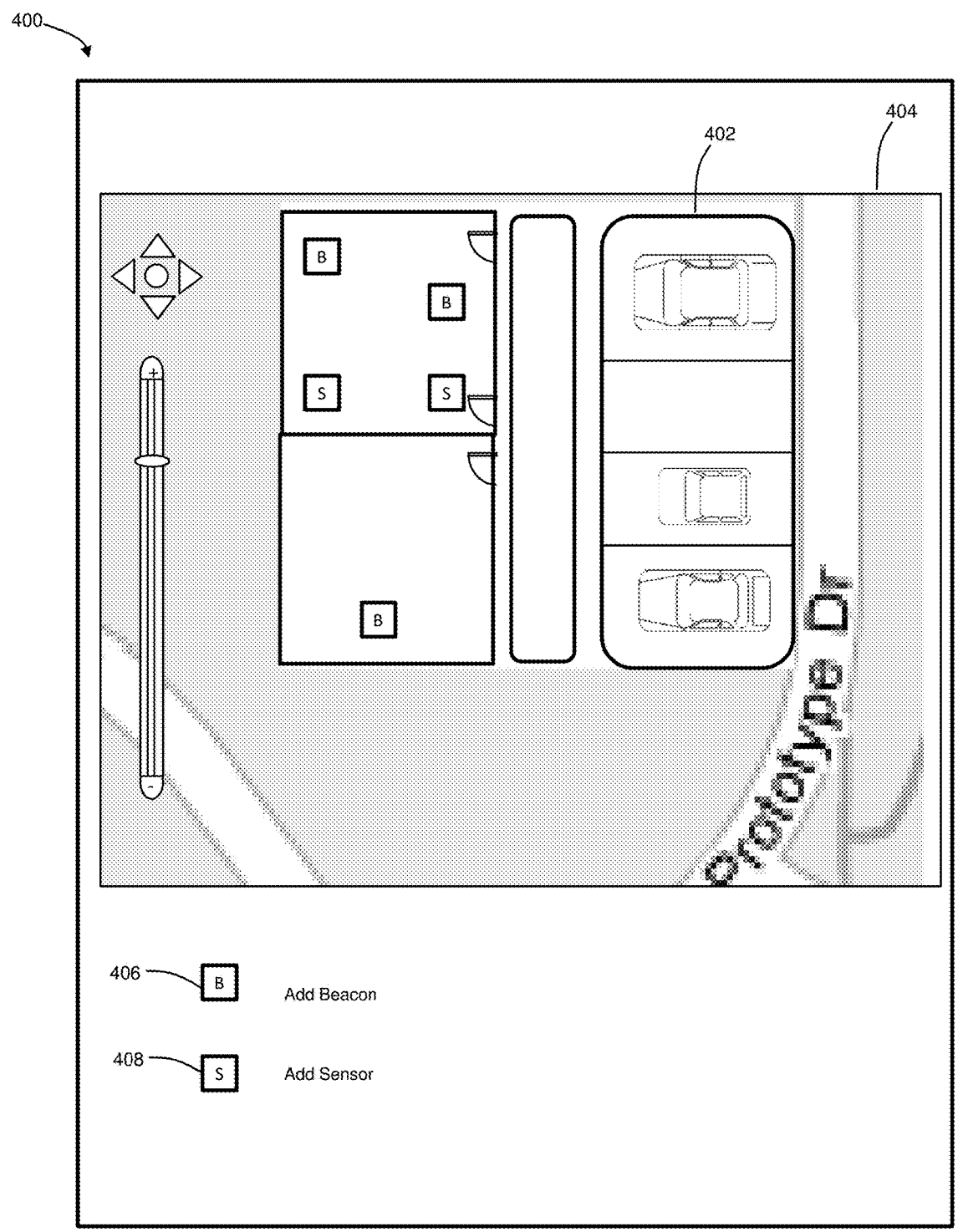
FIG. 4 shows an illustrative network object placement mode of a GIS interface.

Referring now to FIGS. 3 and 4, an illustrative interface for indicating object locations is shown. The object location interface may be used to indicate the locations of objects such as premises maps, network objects such as beacons and sensors, and content bubbles as described further below. The object location interface typically comprises an interface to a geographic information system (GIS). The object location interface allows a user to place an object relative to, for example, a street map. The geographical location of the object may then be determined from the location of the object in the GIS relative to the map. The GIS is configured to allow simultaneous display of one or more object layers. For example, the GIS may display a map layer and a network object layer simultaneously. The GIS may allow a user to select and deselect object layers for display, depending on which layers the user wishes to view.

Referring to FIG. 3, an illustrative object location interface ("GIS interface") 300 is shown. FIG. 3 illustrates how the GIS interface allows a user to indicate the location of a premises map relative to a street map. The magnification bar 304 allows the user to adjust the magnification of street map 302 to the appropriate scale for placement of the premises map. Magnification bar 304 comprises increase magnification indicator 306, decrease magnification indicator 308, and sliding magnification control 310. The user may slide the sliding magnification control 310 in the direction of the increase magnification indicator 306 to increase the level of magnification of the map and may slide the sliding magnification control 310 in the direction of the decrease magnification indicator 308 to reduce the level of magnification of the map. To change the position of the street map 302 within map window 312, navigation control 314 may be used. Navigation control 314 comprises an up arrow, a down arrow, a left arrow and a right arrow. To move the street map in the desired direction, the arrow pointing in the desired direction is mouse clicked. Navigation may additionally or alternatively be accomplished by mouse clicking on street map 302, holding down the mouse button, and moving the mouse to slide the map in the desired direction. It will be recognized that other methods for adjusting map magnification and map position within the map window may be used.

When the appropriate level of magnification has been reached, the user may insert a premises map image 316 over the street map and position the premises map relative to the street map. The user may be prompted to enter a name for the premises map in a text box such as map name text box 318. The user selects a map image file to insert over the street map. The map image file may be any image file format such as BMP, GIF, JPEG, PNG, TIFF, etc. In some embodiments, the user clicks a Browse button 320 to open a dialog box allowing the user to choose a map image file from a file directory. When an image file has been selected, the name of the image file may appear in a text box as shown at 322. The user may then upload the selected map, for example, by hitting an upload map button 314. After the map is uploaded, it appears within map window 312. The premises map image 316 may be resized and rotated with mouse controls or other interface controls. The user may place the premises map image 316 in the appropriate position relative to street map 302. For example, the user may place the premises map image by mouse clicking on the premises map image, holding down the mouse button, and dragging the premises map image to the desired position. It will be recognized that other methods for selecting a map image and positioning it at a desired location relative to a street map may be used. The position of premises map 316 relative to street map 302 is stored in system database 116. The database may also store the level of magnification and extents of street map 302 as shown in map window 312. The premises map image file or a string representing a path to the image file may also be stored in the database. Additionally, the map name entered in text box 318 may be stored in the database.

Referring to FIG. 4, an illustrative network object placement mode of a GIS interface 400 is shown. The network object placement interface allows the user to place network object icons relative to the premises map layer to indicate the location of the network objects on the merchant premises. Network objects comprise beacons and sensors. To add a beacon icon to the premises map 402, the user mouse clicks the beacon icon 406 and a beacon icon appears in map window 404. The user then drags the beacon icon to the desired location on merchant premises map 402. To add a sensor icon to the premises map, the user mouse clicks the sensor icon 408 and a sensor icon appears in map window 404. The user then drags the sensor icon to the desired location on merchant premises map 402. It will be recognized that a variety of other methods for indicating the location of network objects relative to a premises map in a GIS interface may be used. The locations of any beacons or sensors placed on the premises map are stored in system database 116. If network objects are added or removed from a premises or the status of the network object is otherwise changed, the user may update the database using the network object mode of the GIS interface.

Each network object may occupy a unique layer in the GIS. In some embodiments, all network objects are located on a single layer in the GIS. In other embodiments, all sensors are located on a first layer in the GIS and all beacons are located on a second layer in the GIS. The user is provided with controls allowing layers to be switched on and off in the GIS display.

Figure 5:
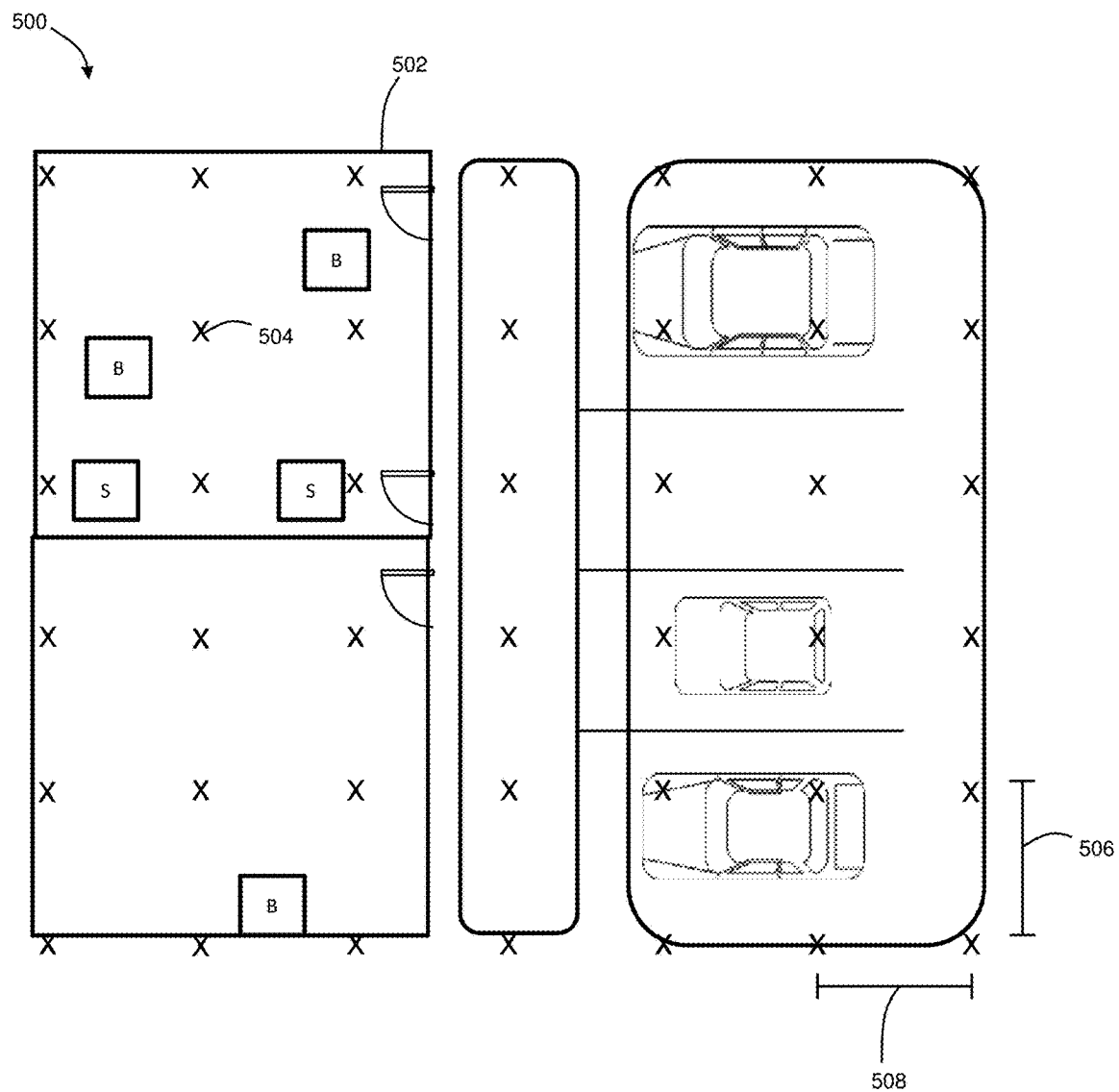
FIG. 5 is an illustrative virtual reference point grid shown relative to a premises map.

The location of the wireless handset relative to the premises is determined based on the relationship between the handset fingerprint and fingerprints calculated at virtual reference points (VRPs). VRPs are theoretical signal profile fingerprints calculated at intervals throughout the premises. Typically, the VRPs are calculated for points in a grid spanning the premises as shown in FIG. 5. VRPs may also be calculated for the area surrounding or proximate to premises 502. The VRP locations for premises 502 are represented by Xs, such as the X shown at 504. Each VRP comprises a theoretical signal strength for each beacon associated with the premises and data indicating a location, such as GPS coordinates. The distance between VRPs in the grid is the interval distance. In some embodiments, a first interval distance is an y-axis interval distance 508 and a second interval distance is a x-axis interval distance 508. In other embodiments, the x-axis interval distance is equivalent to the y-axis interval distance and a single interval distance is used.

If a beacon stops emitting a signal, is moved or an obstruction is placed in the vicinity of the beacon such that the signal profile for the beacon changes on the premises, the sensors are capable of detecting the change. The VRPs may then be updated, periodically or in response to a change in sensor fingerprint.

In some embodiments, the VRPs may be exported from the server to the GIS interface. A VRP layer in the GIS interface would provide feedback to the user on the accuracy of the positioning system. The user could use the feedback to, for example, reposition sensors and beacons to optimize the positioning system. The VRP layer could also allow the user to indicate VRP locations.

Referring to FIG. 6, an illustrative VRP is shown. The VRP comprises a longitude value and a latitude value indicating the location of the VRP. The VRP further comprises a signal identifier and an RSSI for each beacon associated with the premises. For example, in the illustrative VRP shown, the signal identifier is "Beacon 1" and the RSSI corresponding to Beacon 1 is −33 dB.

Figure 7:
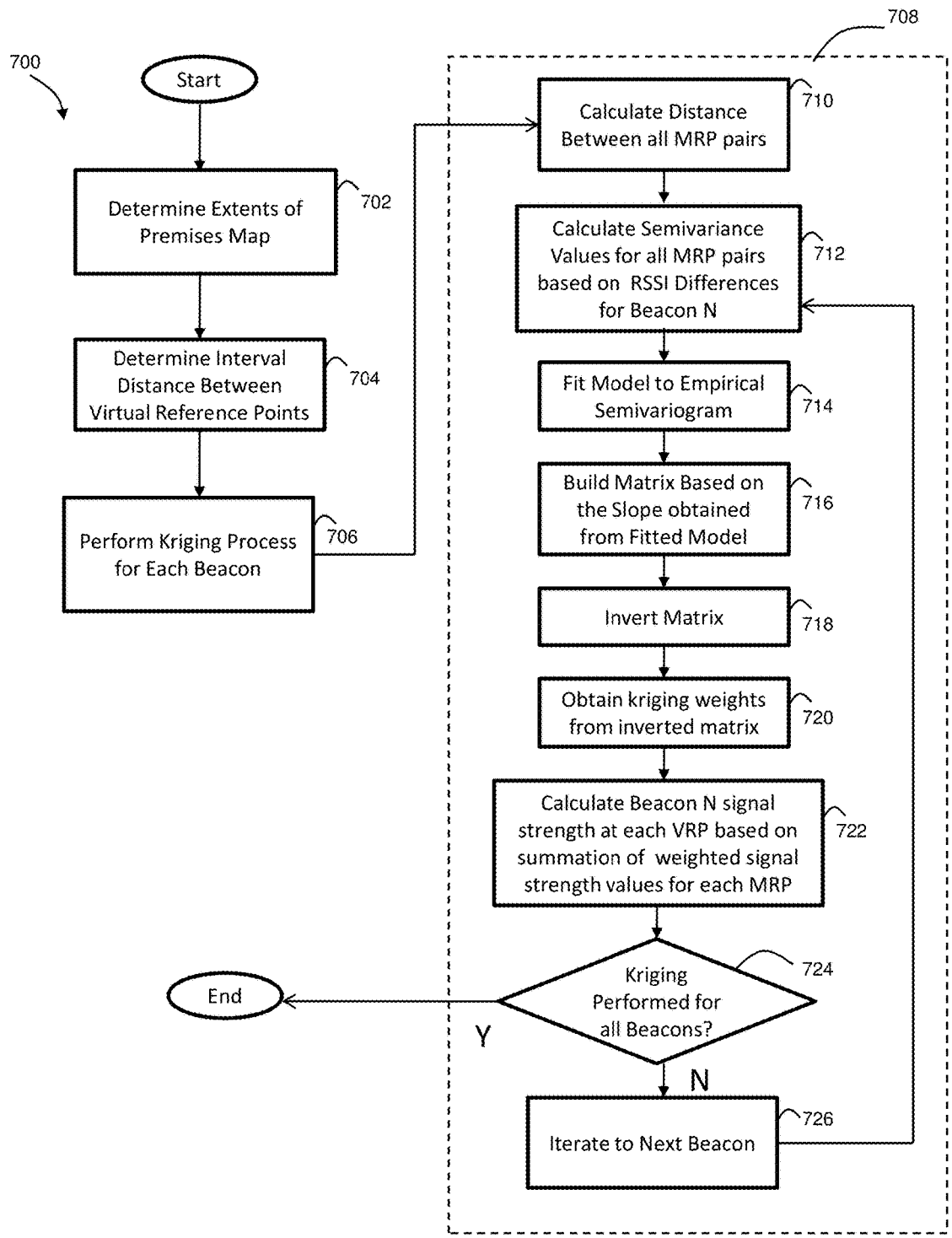
FIG. 7 shows an illustrative flow chart for generating virtual reference points.

Referring to FIG. 7, an illustrative flow chart for generating VRPs is shown. VRPs are typically calculated by an application within system database 116. VRPs may be calculated periodically. In some embodiments, the VRPs are calculated in response to user activity, such as a user request to calculate VRPs placed via a user interface to server 112. The method starts at block 702, at which the extents of the premises map are obtained from system database 116. The extents of the premises map may be determined from the placement of the map image via the GIS interface as illustrated in FIG. 3. The method then proceeds to block 704, at which the interval distance between VRPs is determined. The interval distance is the distance between adjacent VRPs, such as the horizontal or vertical distance between adjacent Xs as shown in FIG. 5. In some embodiments, a first interval distance and a second interval distance are used, wherein a first interval distance is an x-axis interval distance and a second interval distance is a y-axis interval distance. The locations of all VRPs for the premises are generated in a grid similar to the VRPs shown in FIG. 5 based on the specified interval distance(s). The user is able to set the interval distance(s) via a user interface to server 112. In some embodiments, VRPs may be individually placed by the user, for example, using the GIS interface.

The method continues to block 706, at which a kriging process is performed for each beacon associated with the premesis. Kriging is an interpolation method based on the spatial correlation of data. The kriging process as shown within the box indicated at 708 is performed iteratively for each beacon until it has been performed for all of the beacons associated with the premises. At block 710, the Euclidian distances between every pair of measured reference points associated with the premises are determined. In other words, the distance between every measured reference point and every other measured reference point is calculated. A measured reference point (MRP) may be a sensor fingerprint or a fingerprint obtained by other measurement means.

The calculated distances are stored in system database 116. The kriging process continues at block 712, where semivariance values for all MRP pairs are calculated based on the difference in RSSI values the MRPs received from Beacon N. For example, in the first iteration of the kriging process, N=1, so the RSSI value for beacon 1 at the first MRP is compared to the RSSI value for beacon 1 at a second MRP, and the calculation is repeated for each pair of MRPs associated with the premises. At block 714, an empirical semivariogram based on the values calculated in blocks 710 and 712 is fit to a model such as a linear least squares regression (LLSR). At block 716, a matrix is created based on the slope obtained from the fitted model and the distances calculated in block 710. The matrix is then inverted as indicated at block 718. The weights to be used for predicting signal strength values at the VRPs are obtained from the inverted matrix, as indicated at block 720. The signal strength for beacon N is then calculated at each VRP based on the summation of weighted signal strength values for each MRP, as indicated at block 722. The method proceeds to decision diamond 724, at which it is determined whether steps 712-722 have been performed for all beacons. If not, the method iterates to the next beacon as indicated at block 726. When steps 712-722 have been performed for all beacons, the method ends.

Figure 8:
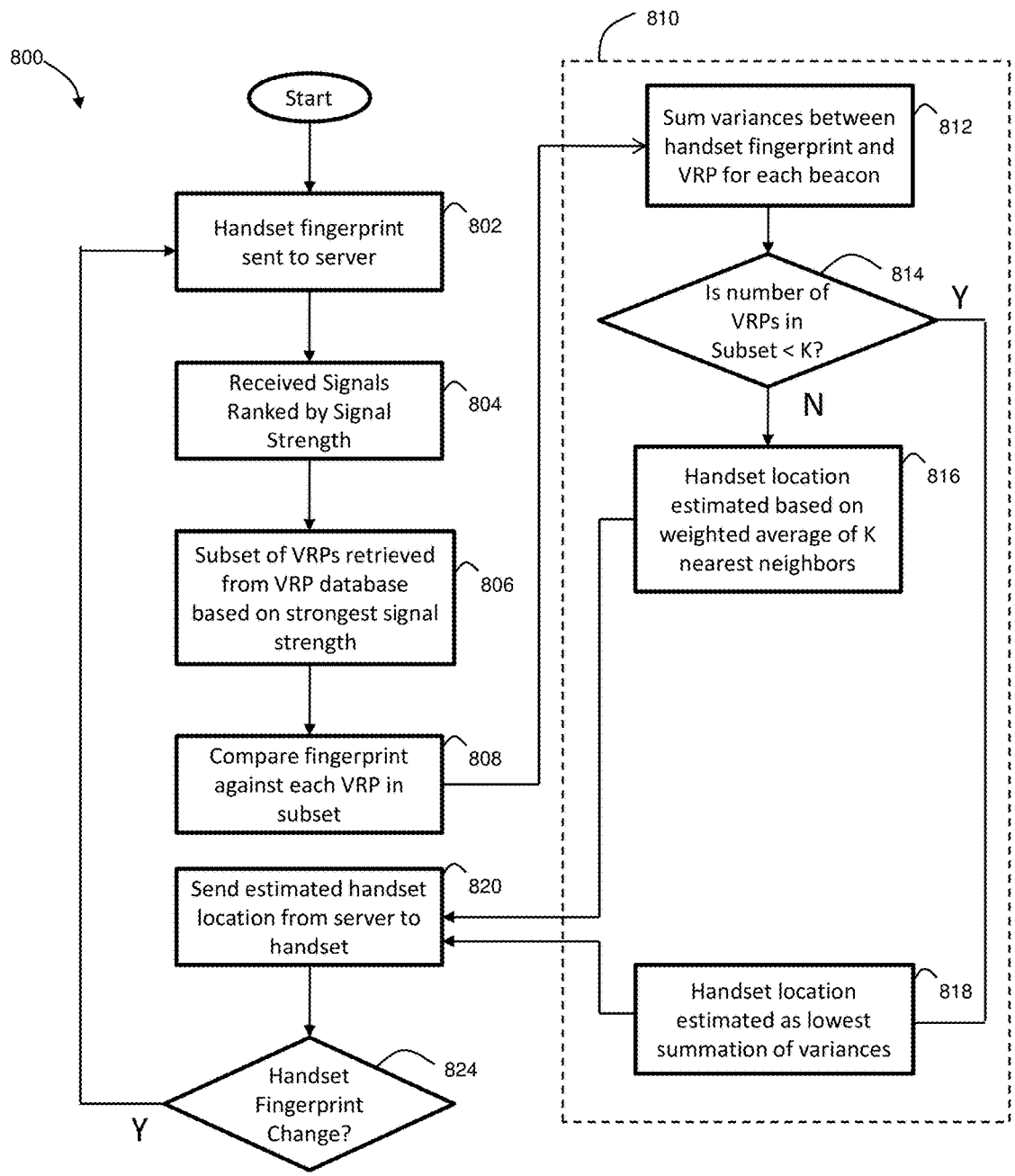
FIG. 8 shows an illustrative method for determining the position of a wireless handset using virtual reference points.

Referring to FIG. 8, an illustrative method for determining the position of a wireless handset using VRPs is shown. The method begins at block 802, at which a handset fingerprint comprising the signal identification and signal strength of each beacon in range of the handset is sent from the wireless handset to server 112. The method continues to block 804, at which the signals received by the handset are ranked by signal strength. The method continues to block 806, at which a subset of the VRPs are selected from the set of VRPs associated with the premises. The subset of VRPs are those VRPs with a greatest received signal strength from a beacon matching the beacon from which the handset received the greatest signal strength. The method continues to block 808, at which the signals of the handset fingerprint are compared to the signals of the subset of VRPs. A K-nearest neighbor algorithm as illustrated at 810 may be used to determine the outcome of the comparison.

At bock 812, for each VRP in the subset of VRPs, the variance between the signal level received at the handset and the estimated signal level at the VRP is determined for each beacon. At decision diamond 814, it is determined whether the number of VRPs in the subset is less than an integer value K. If the number of VRPs in the subset is greater than or equal to K, the handset location may be estimated to be at a location between the K nearest VRPs. For example, the location of the handset may be determined to be at a location that is a weighted average of the nearest neighbors, such that the neighbors having a lower summation of variances contribute more to the average, as indicated at block 816. If the number of VRPs in the subset is less than K, the handset location is estimated to be the location of the VRP having the lowest summation of variances between beacon levels as received at the handset and beacon levels estimated at the VRP, as indicated at block 818. Once the handset location has been estimated, the method proceeds to block 820, at which the estimated location is then sent from the server to the handset. If the handset fingerprint changes, indicating a change in handset location, the method begins again at block 802.

In some embodiments, the methods of FIGS. 7 and 8 are performed on a remote server or wireless device connected to the handset position detection system via network 110.

Figure 9:
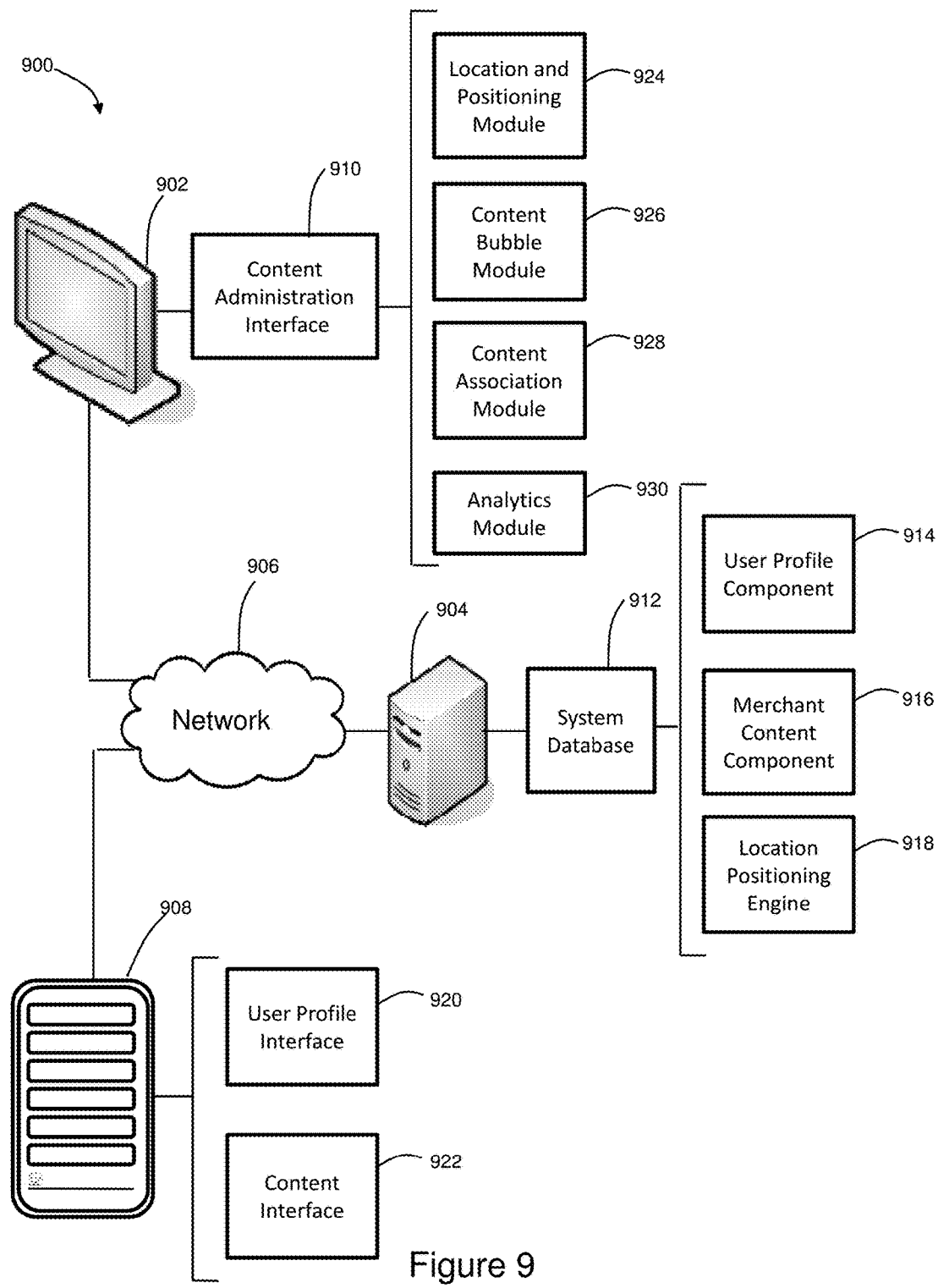
FIG. 9 shows an illustrative system architecture for a merchant content delivery system.

Referring now to FIG. 9, an illustrative system architecture for a content delivery system is shown. The content delivery system comprises an interface that allows a content administrator to specify content to be provided to a wireless handset depending on factors including the location of the wireless handset, information about the handset user, time and date. The system architecture comprises a content administration terminal 902, a server 904, a wireless network 906 and a wireless handset 908. Server 904, wireless network 906, and wireless handset 908 are as described with reference to server 112, network 110 and wireless handset 120 of FIG. 1A, respectively.

The content administration terminal 902 is a computing device capable of presenting a user interface to the content administrator for exchanging data with server 904. The content administration terminal may be, for example, a personal computer or wireless device.

Content administration terminal 902 and wireless handset 908 may be communicatively coupled to server 904 via wireless network 906.

The software associated with content administration terminal 902 comprises a content administration interface application 910. The content administration interface application may be installed on the content administration terminal. Alternately, the content administrator interface may run on a remote computer and be accessed by the content administration terminal via the network 906. For example, the content administrator interface application may be accessed via an internet browser.

The software associated with the wireless handset 908 comprises a user profile interface 920 and a content interface 922. The user profile interface and the content interface may be components of a single application or may be separate applications. The content interface and user profile interface may run on the handset or may run on a remote source and be accessed by the wireless handset via the wireless network 906. The user of the wireless handset uses the user profile interface to provide information about the user to content administrators.

A system database 912 runs on server 904. System database 912 comprises a user profile component 914, a content component 916, and a location positioning engine (LPE) 918. The user profile component 914 comprises user attributes provided by the user through the user profile interface 920. In some embodiments, the user profile component further comprises user attributes generated by the content administrator. For example, the content administrator may generate a user attribute indicating the transaction history for a user. The content component 916 comprises information provided by the content administrator through the content administrator interface 910. The LPE comprises an application for determining the position of the wireless handset as described with reference to FIGS. 1, 7 and 8 above.

In an alternative embodiment, one or more of the content administration interface, one or more of the location and positioning module 924, content bubble module 926, content association module 928, analytics module 930, user profile component 914, merchant content component 916, and location positioning engine 918 are hosted on a remote server or a wireless device connected to the content delivery system via network 906.

The content administrator interface 910 may comprise one or more interface modules, such as a location and positioning module 924, a content bubble generation module 926, a content association module 928, and an analytics module 930. The LPE 924 allows a content administrator to indicate the location of one or more network objects on the premises, as illustrated in FIG. 4. The content administrator is a user of the content administrator interface 910 who may use the interface to indicate the location of a premises map or network objects and define and configure content for delivery to wireless handsets. The locations of beacons and sensors are stored in the location and positioning database 918. The LPE 924 may further allow the content administrator to indicate the location of the premises on a mapping application. The location of the premises is also stored in the location and positioning database. The content bubble module 926 allows the content administrator to delineate an area comprising part or all of the premises. Content bubbles are described in more detail below. The content association module 928 allows the content administrator to create content associations in the content database 916. The content associations may include associations of content with user attributes stored in the user profile database 916 and associations of content with content bubbles. The associations between the content and user attributes are stored in the content database 916. Content is provided from content database 916 to content interface 922 via wireless network 906. In some embodiments, an analytics module 930 allows the content administrator to collect statistical information regarding the user reactions to content received at content interface 922.

The illustrative content delivery system indicated in FIG. 9 is local to a premises and connected via a local area network that may be protected by a firewall. In some embodiments, one or more components of the content delivery system is external to the firewall. The network may alternatively be a wide area network or other network for facilitating communication between components. In some embodiments, one or more elements of the content delivery system is remote from the premises and connected to the network 906 via a wide area network. Caching may occur at any component of the content delivery system.

Figure 10:
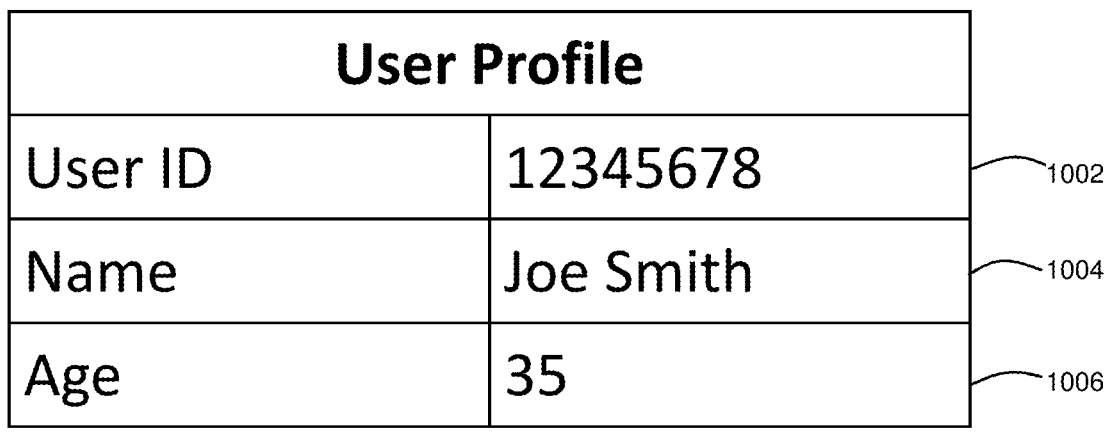
FIG. 10 shows an illustrative database table entry for a user profile.

Referring to FIG. 10, an illustrative database table entry 1000 for a user profile is shown. The user profile table typically resides on server 904. The table may be populated by the user with information provided via a user profile interface 914 on the wireless handset 908. In some embodiments, the user enters user profile information using an interface on a home computer or other device having access to the internet. The user profile table may comprise fields to store information such as a user ID 1002, name 1004, and age 1006. The profile table may store additional information such as a user address.

Figure 11A:
FIG. 11A shows an illustrative database table entry for a user attribute table.

Referring to FIG. 11A, an illustrative database table entry 1100 for a user attribute table is shown. The user attribute table may be located on wireless handset 908 or on user profile component 914 of system database 912 on server 904. Locating the user attributes table on the wireless handset protects user privacy by maintaining information in a location where the user has control over the information. The user attribute table may comprise fields for storing a user ID 1102, a unique attribute identifier 1104, an attribute category 1106, and an attribute value 1108. Attributes may be linked to a single user in a many-to-one relationship through use of a user attribute table. Attribute category "Pet" may have several attribute values associated with it, such as "Dog," "Cat," "Bird," and "Fish." A user may be able to associate multiple attribute values with a particular attribute category. Thus, a user may be able to have multiple pet types associated with the user profile. Entry 1100 links the user ID 1102 of FIG. 11A with the attribute value "Dog". The data stored in entry 1100 indicates that user 12345678 has a pet dog. This is information that may have been provided by the user through an interface on a wireless handset 908 or other device. In some embodiments, the user attribute table comprises entries generated by a content administrator. For example, the user attributes table may contain an entry associating a user ID with attributes indicating the user's transactional history with the content administrator's business.

In some embodiments, the user profile table and user attributes table are located on the wireless handset 908. Locating the tables containing user information on the wireless handset protects user privacy by storing information in a location where the user has control over the information.

Figure 11B:
FIG. 11B shows an illustrative database entry for an attribute group table.

Referring now to FIG. 11B, an illustrative database table entry 1150 for an Attribute Group Table is shown. Each entry in the attribute group table associates a user ID 1152 with an attribute ID 1154. The attribute group table may be populated with values stored in the User Attribute Table on a periodic basis, such as an hourly, daily, or weekly basis. In some embodiments, the attribute group table is updated every time the user attribute table is changed. The use of an attribute group table increases the efficiency of delivering content to users.

Figure 12:
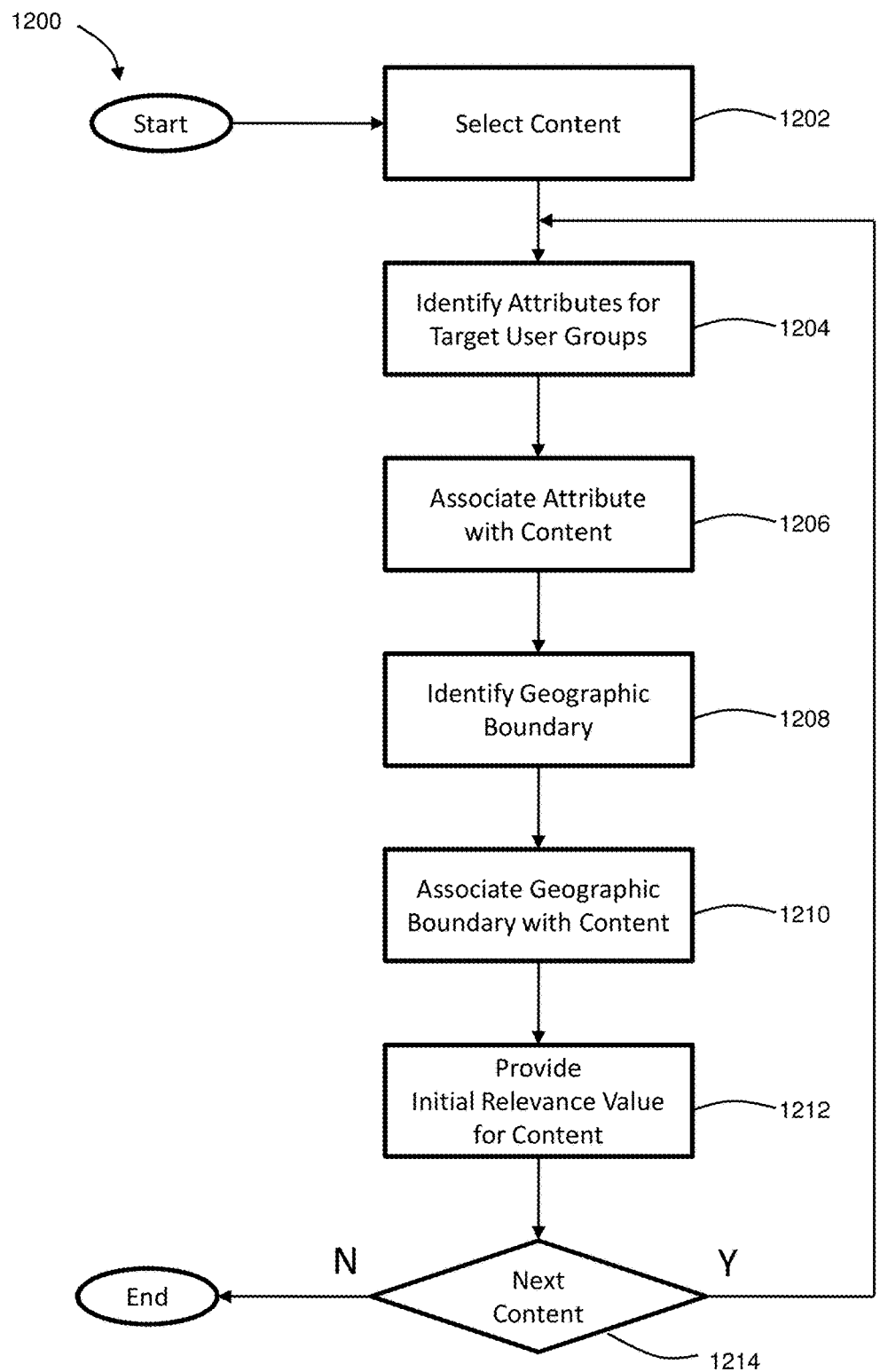
FIG. 12 shows an illustrative flow chart for associating content with a user attribute.

Referring to FIG. 12, an illustrative flow chart for associating content with a user attribute is shown. The method begins at block 1202, in which the content administrator chooses a content item. A content item may be any information or product promotion shared with a user. For example, content may include a product location, product details, event information, or a coupon. A content item may also be a link to one or more content items, such as a restaurant menu that links to a list of menu items. In some embodiments, a content item may be an application, such as a purchasing or gaming interface. A content item may also be a request for user feedback.

The method proceeds to block 1204, in which the content administrator optionally identifies user group attributes to associate with a content item. For example, if a content item "Pet Store" was selected at block 1202, the content administrator may wish to associate group attributes indicating an interest in pet supplies with the content item. The content item "Pet Store" may be a link leading to a list of pet supplies available from the pet store, such as dog food. The content administrator may wish to associate user attributes indicating an interest in dogs with the content item "Dog Food." At block 1206, the content administrator associates the selected user attributes with the selected content item.

In some embodiments, the content administrator is prevented from accessing some or all of the information stored in the user profile. User privacy may be protected by restricting content administrator access to sensitive user information. For example, the content administrator may be able to determine how many users fall within a particular age range without being able to access the user attribute indicating user age for a particular user.

At block 1208, the content administrator uses content bubble module 926 to define a geofence on or near a premises. The geofence is a virtual boundary line enclosing part or all of a premises. The area within the geofence is described as a content bubble because the content administrator may associate the geofenced area with one or more content items. Content bubbles are described further below with reference to FIGS. 13-16. At block 1210, the content administrator may associate a content bubble defined by the geofenced area with the selected content.

At block 1212, the content administrator provides an initial relevance value for the content item. The initial relevance value indicates the applicability of the selected content item for the selected group attribute as perceived by the content administrator. For example, for the content item "Dog Food," the content administrator may assign a higher initial relevance value for the user attribute value "Dog" than the content administrator would assign for the user attribute value "Cat," since a user who has indicated an interest in dogs may be more likely to be interested in purchasing dog food than a user who has indicated an interest in cats.

At decision diamond 1214, the content administrator may proceed to the next content item if the content administrator wishes to associate a next content item with a next user attribute value. If the content administrator has made all assignments, the method ends.

In some embodiments, the content administrator may also exclusively associate a group attribute with a content item. For example, if the content administrator intends for the content item "Grooming Services" to be hidden from users who do not own dogs, the content administrator may exclude such users from receiving the content item. The group attribute corresponding to users who do not own dogs is excluded from association with the content item "Grooming Services".

Referring to FIG. 13A, an illustrative content administrator interface 1300 for creating content connections is shown. The content administrator may use the interface shown in FIGS. 13A-13B to carry out optional association of content items with user attributes as indicated in FIG. 11A. The content administrator selects a content item from a predefined list of content items as shown in the drop down menu 1302. The list of content items is comprised of content previously uploaded by the content administrator and stored in the database. In the illustrative example shown in FIG. 11A, the content administrator has chosen the content item "Dog Food."

The content administrator chooses a group attribute to associate with the content item using drop down menus 1304 and 1306. At menu 1304, the content administrator chooses attribute type "Pet." In menu 1306, the content administrator has selected the attribute value "Dog" to associate with the selected content item. Only those users who have an interest in dogs, as indicated in the user profile stored in the user profile component 914 of system database 912, will receive the content specified in menu 1302.

In some embodiments, the content administrator may associate content items with content administrator generated attributes. Content administrator generated attributes are attributes associated with a user that were not specified by the user. For example, a content administrator generated attribute may include past user transactions with the content administrator's business.

The content administrator is provided with a level menu 1308. The level indicates whether the content item is a parent item, such as a standalone link or a link to a submenu, or a child item, such as a submenu content item. As shown at 1308, the content administrator has specified that content item Dog Food is a level 1 item. This indicates that the Dog Food content item is a top level content item which may serve as a parent to a set of lower level content links.

The content administrator may assign an initial relevance value to the content-attribute association created in tables 1302-1306. The initial relevance value may be a numerical value, such as a number falling in the range of 0-100, with zero indicating minimum relevance and 100 indicating maximum relevance. As shown in 1310, the content administrator has chosen an initial relevance weighting value of 90.

Referring to FIG. 13B, a second illustrative content administrator interface 1350 for creating content connections is shown. The content administrator may desire to associate content items comprising a submenu to a top level content item. For example, the content administrator may wish to create a submenu for content item Dog Food. The submenu may contain, for example, a coupon for a particular brand of dog food. To create the submenu, the content administrator selects the desired submenu content item from Content Item menu 1352. The content item "Puppy Chow Coupon" has been selected from Content Item menu 1352. The content administrator then creates content connections to associate one or more user attributes with the content item. For example, in drop down menu 1354, the content administrator has chosen the user attribute type "Pet." The content administrator may wish to associate the content item(s) with an attribute type without specifying an attribute value. For example, the content administrator may choose to associate the selected content item "Pet Owner Manual" with all users who have selected user attribute type Pet.

Alternatively, the content administrator may wish to associate the selected content items with a group attribute having a particular value. In menu 1356, the content administrator has selected the attribute value "Dog" to associate with the selected content items. Only those users who have indicated an interest in dogs through the user attributes associated with their user profiles will receive the content specified in menu 1352.

To indicate that the content item selected, Puppy Chow Coupon, is linked to a parent content item, the content administrator sets the level to a value that is one greater than the value of the parent level. Thus, since Puppy Chow Coupon is an item in a submenu of menu item Dog Food, Puppy Chow Coupons is given a level value of 2, which is one greater than the Dog Food level value of 1. If the level value is greater than one, a Parent Content Item menu appears as shown at 1362. The parent content item menu is populated with all content items having a level value that is one fewer than the level value specified in 1360. Thus, since Dog Food was given a level value of 1, which is one fewer than the level value specified in 1360, the content item Dog Food appears in the Parent Content Item menu. The content administrator chooses the parent content item, for example, Dog Food, to assign the level 2 content item Puppy Chow Coupon to level 1 content item Dog Food.

If the content administrator wishes to create additional level 2 submenu items under level 1 menu item Dog Food, the content administrator adds new content item associations, specifying a level value of 2 and a parent item of Dog Food. The content administrator may also create submenus of submenus by creating a level 3 content item and specifying a level 2 parent content item for the level 3 content item.

The content administrator may assign an initial relevance value to the child content item. As shown in 1358, the content administrator has chosen an initial relevance weighting value of 80.

In FIG. 13B, the content administrator has selected "Puppy Chow Coupon" from the submenu items list. A user who indicated an interest in dogs may receive the content item "Dog Food" on the user's wireless handset, as established in the interface shown in FIG. 13A. If the user selects "Dog Food," the user will be shown a submenu comprising the content item "Puppy Chow Coupon," as established in the interface shown in FIG. 13B.

In some embodiments, the content administrator is able to associate additional filters with the content item user attribute association. The content administrator may wish to serve content to a user based on a time range, date or user location. For example, the content administrator may associate a content item such as a coupon for coffee with a time range, such as 7:00 AM to 11:00 AM, so that the coupon is delivered to users during this time range. In a second example, the content administrator associates a coupon for coffee with a time range and with a user attribute indicating a user preference for coffee. In the second example, only those users that have specified a preference for coffee receive the coffee coupon content item during the specified time range. Content may be filtered by user location based on information provided by the user's wireless handset to the server regarding the user's location. In some embodiments, the content administrator may associate a content item with a time, date, location or other filter without associating the content item with a user attribute. In other embodiments, the content administrator may be able to provide content items to all users by indicating no filter is to be applied to such content items.

Figure 14:
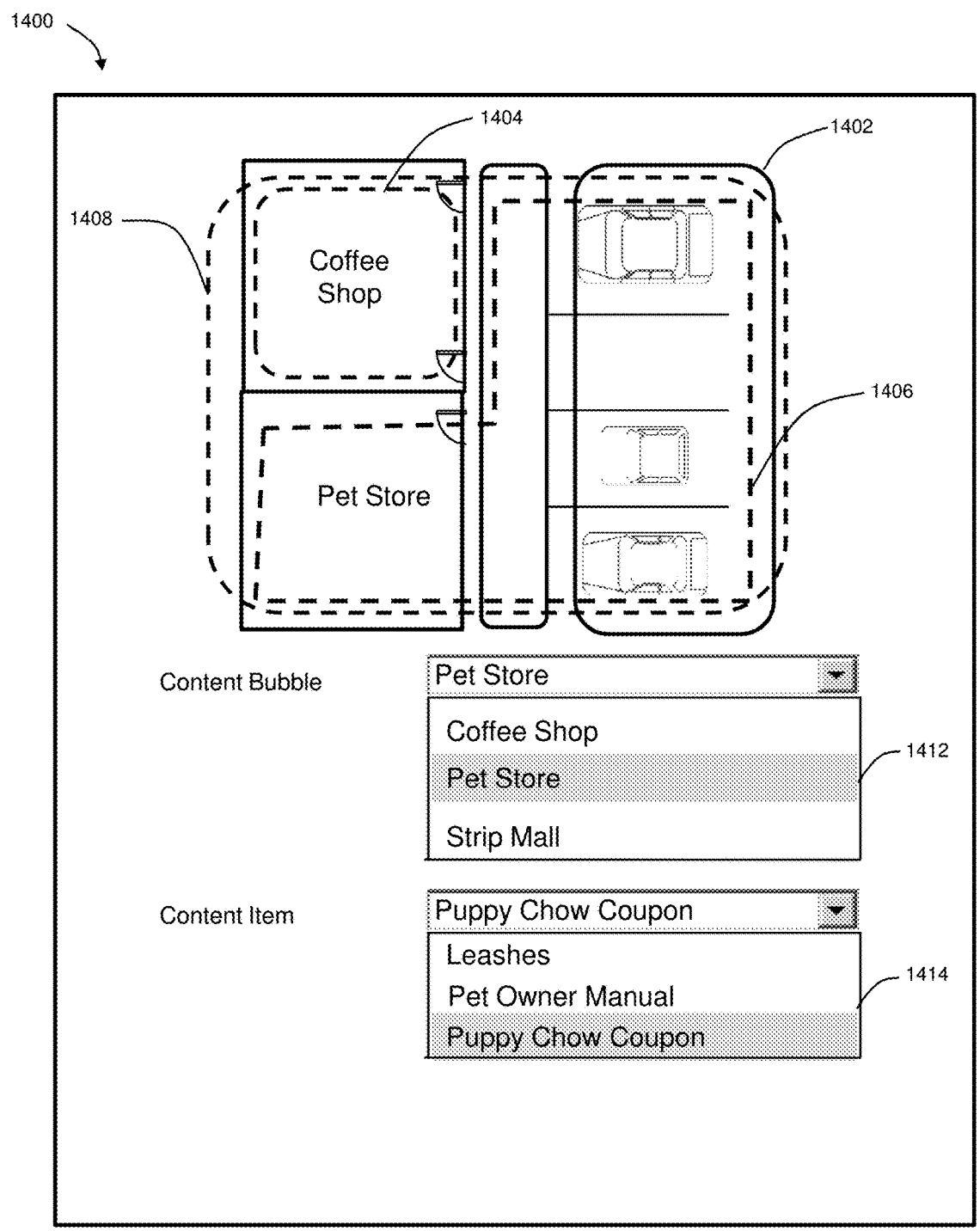
FIG. 14 shows an illustrative content bubble generation interface.

Referring to FIG. 14, an illustrative content bubble generation interface 1400 is shown. The content administrator uses the content bubble generation interface to define one or more sections of the area on or near a premises with which the content administrator wishes to associate content items. A wireless handset entering the area indicated by a content bubble may receive the content items associated with content bubble. The content administrator provides a map image 1402, such as a premises floor plan, on which the content bubbles will be defined. The map may be provided by uploading an image file to the content administrator interface. Multiple content bubbles may be defined for a single area. The content bubbles may overlap.

In FIG. 14, content bubbles 1404, 1406, and 1408 have been defined, corresponding to the Coffee Shop area; the Pet Store area, which also comprises the sidewalk and parking lot areas; and the entire strip mall area; respectively. In some embodiments, the content administrator may wish to provide content to users who have not yet entered a premises. In FIG. 14, a content administrator has defined content bubbles surrounding parking lot and sidewalk areas proximate to the premises for content bubble 1406.

The content bubble interface comprises a content bubble selection drop down menu 1412 and a content item selection drop down menu 1414. Content bubble 1406 corresponding to the Pet Store area has been selected from content bubble menu 1412. The content administrator has chosen from content item menu 1414 the content item Puppy Chow Coupon. The information entered in the interface shown in FIG. 14 is used to determine which users will receive the content items designated in menu 1414. In FIG. 13B, the content item Puppy Chow Coupon was associated with a user having a user attribute indicating an interest in dogs. Because this content item has been associated with content bubble 1406 (the Pet Store area), when a wireless handset belonging to a user having an interest in dogs moves into the Pet Store content bubble, the user will receive the Puppy Chow Coupon content item.

Figure 15:
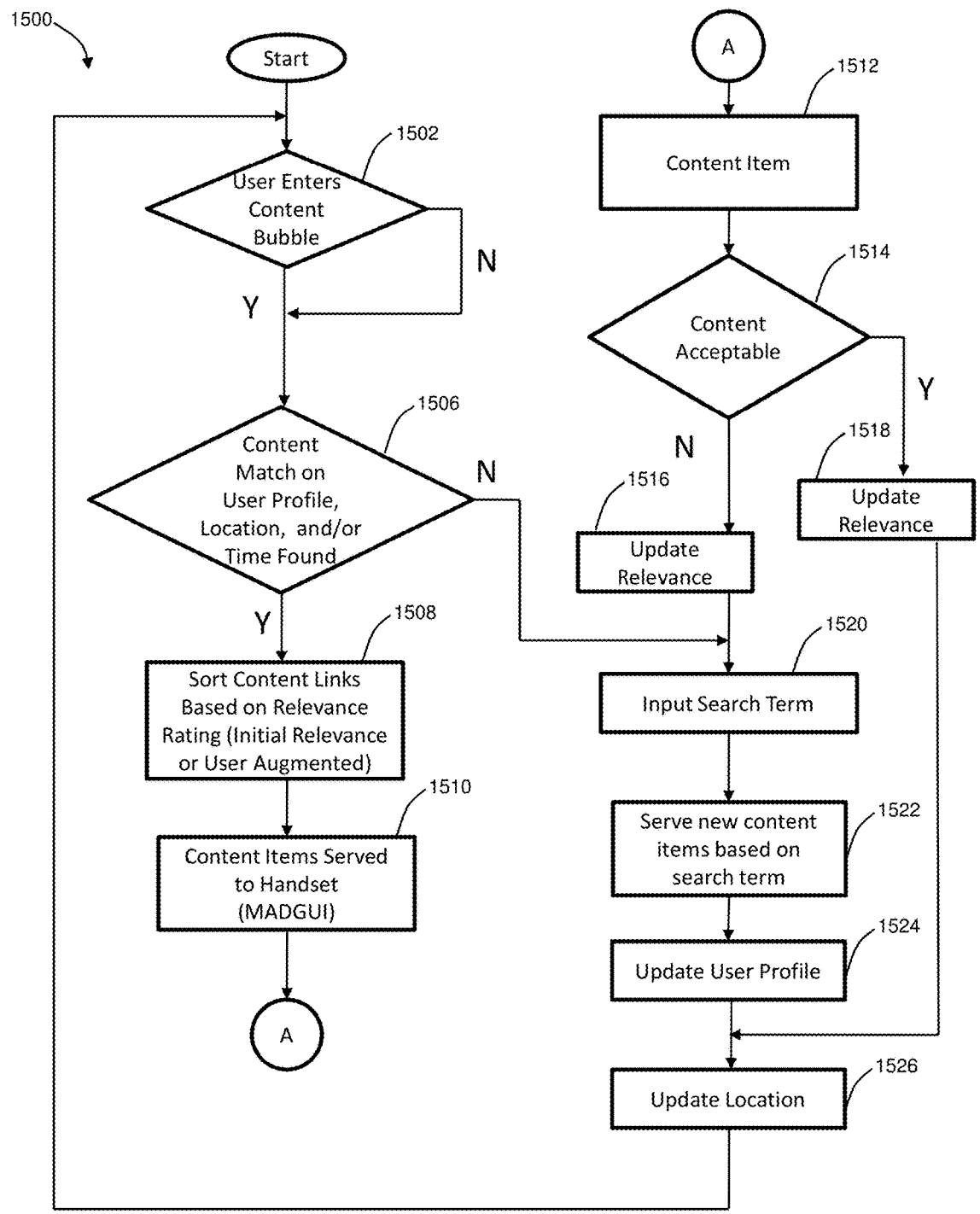
FIG. 15 shows an illustrative flow chart illustrating a method for delivering content to a user.

Referring now to FIG. 15, a flow chart 1500 illustrating a method for delivering content to a user is shown. The method begins at decision diamond 1502, in which the handset application running on wireless handset 908 continually sends the user location to server 904 and the server determines whether the user location corresponds to the area within a content bubble.

User location relative to a content bubble, as determined from the position of the user's wireless handset, may be determined as described with reference to FIGS. 7-8. User location may alternatively be determined by global positioning system (GPS) coordinates or signal strength from known regional wireless access points as detected by wireless handset 908.

If the user has entered a content bubble, the handset sends the user ID to the server. A content delivery application may use one or more of the location, the local time at the user location, and the user group attributes associated with the user ID to determine which content to deliver to the handset, as shown at decision diamond 1506. If no content matches are found, the user may be prompted to input a search term as indicated at block 1520, allowing the user to find relevant results.

There may be a maximum number of content items desired to be displayed on the handset. The maximum number may be determined by the content administrator or by the handset user. If the number of content matches found exceeds the number of content items to be displayed, the content delivery application may sort through the content matches to find the most relevant matches, based on the relevance value, as shown at block 1508. In some embodiments, content matches will only be displayed when a relevance value exceeds a threshold value, for example, 50 on a scale of zero to 100. The relevance value may be based on an initial relevance value set by a content administrator. The relevance value may be updated in accordance with user feedback.

At block 1510, the selected content matches are sent from server 904 to the content interface 922 running on wireless handset 908. The method continues to block 1512, in which a user selects a content item. The user may be presented with an option to provide feedback on the content item, as indicated at decision diamond 1514. User feedback may be provided via a ranking system. For example, the user may be provided with the option to rate the content item on a scale of one to five stars. The user may also be provided with the option to reject or accept the content item. In some embodiments, data on the acceptability of the content provided to the user is collected without active input of the user, for example, by tracking clickthrough rates on the content items served. The content acceptability feedback is used to update the relevance value for the content item, as indicated at blocks 1516 and 1518.

If the content is deemed acceptable, the method proceeds to update the location of the handset as indicated at block 1526.

If the content is deemed unacceptable or receives a low user rating, the user may be prompted to input a search term as indicated at block 1520, allowing the user to find preferable results. The method then proceeds to block 1522, in which new content items are served based on the results of the search performed using the entered search term. A user attribute may be added to the user profile based on the search term input by the user, as indicated at block 1524. The method then proceeds to block 1526, at which point the handset sends an updated user location to the server.

Figures 16A, 16B:
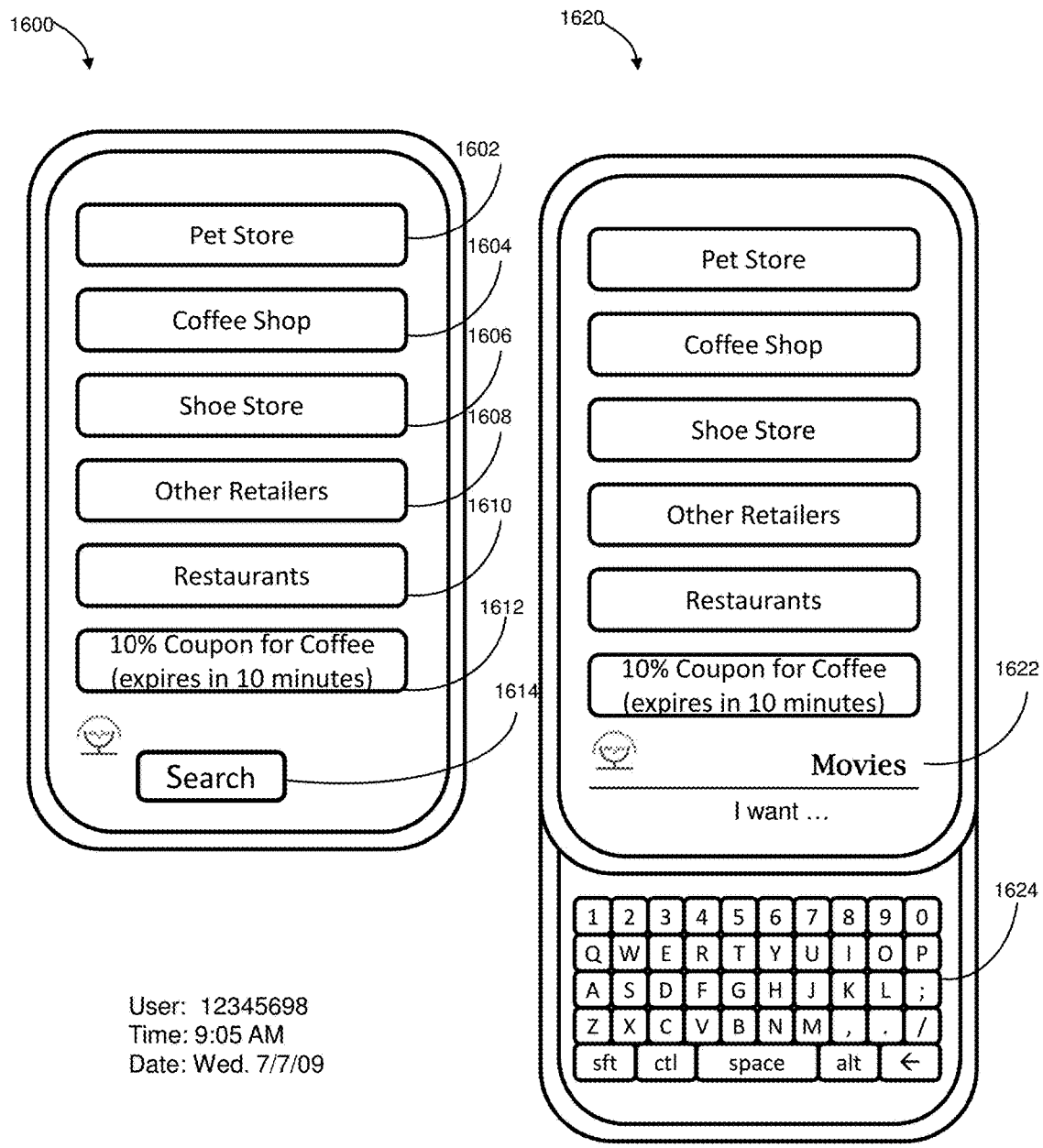
FIGS. 16A-16D show an illustrative content interface.

Referring to FIG. 16A, an illustrative content interface (MADGUI) is shown on a wireless handset. The MADGUI may be an application that is downloaded to the wireless handset from a remote server. The MADGUI is preferably an application that is optimized to minimize use of handset battery resources. The handset shown is a slide phone having a retractable keypad, however, the wireless handset may be any format, such as a bar-type or flip-type phone or a phone having a touchscreen interface. The MADGUI is initiated by the handset application when content matches are found as indicated in decision diamond 1506. When content matches are found, the MADGUI is populated with content matches sent from server 904. The server delivers content to the user based on the content item-user attribute associations and other filters the content administrator has specified. Wireless handset display 1600 shows Coffee Shop 1602, Pet Store 1604, Shoe Store 1606, Other Retailers 1608, Restaurants 1610, and a 10% Coupon for Coffee 1612.

The user may have received coupon 1612 based on a preference expressed in a user attribute. Alternatively, the coupon may have been received based on the time of day that the user is accessing the MADGUI. For example, the content administrator may have specified that a coffee coupon is to be provided between the hours of 9 AM and 1 PM. Finally, the coupon may have been received based on a combination of a user profile preference and another filter such as a time filter. Similarly, the other MADGUI items may be based on a user attribute-content item association provided by a content administrator, a filtering association, or a combination of user attribute and filter association with a content item.

If the user selects Restaurants, the user may be provided with a submenu of restaurants in the vicinity of the user. The submenu may be filtered based on user attributes or based on the past behavior of the user. For example, the submenu may be filtered to include only those services or businesses with which the user has engaged previously. The submenu may include a coupon for a service engaged previously.

Referring to FIG. 16B, an illustrative MADGUI prompting a user to input a search item is shown. The user may be prompted to or choose to input a search item, for example, by being shown or hitting a search button such as the button shown at 1614 in FIG. 16A, if none of the content items delivered in the MADGUI are acceptable. In FIG. 16B, the user has entered the search term "Movies" at 1622. The user may use keypad 1624 to enter the search term. Other wireless handsets may allow search term entry using the handset's numeric keypad, touchscreen keypad, or other input device. The MADGUI application will perform a search of content items applicable to the search term and present content to the user based on the results of the search.

Figures 16C, 16D:
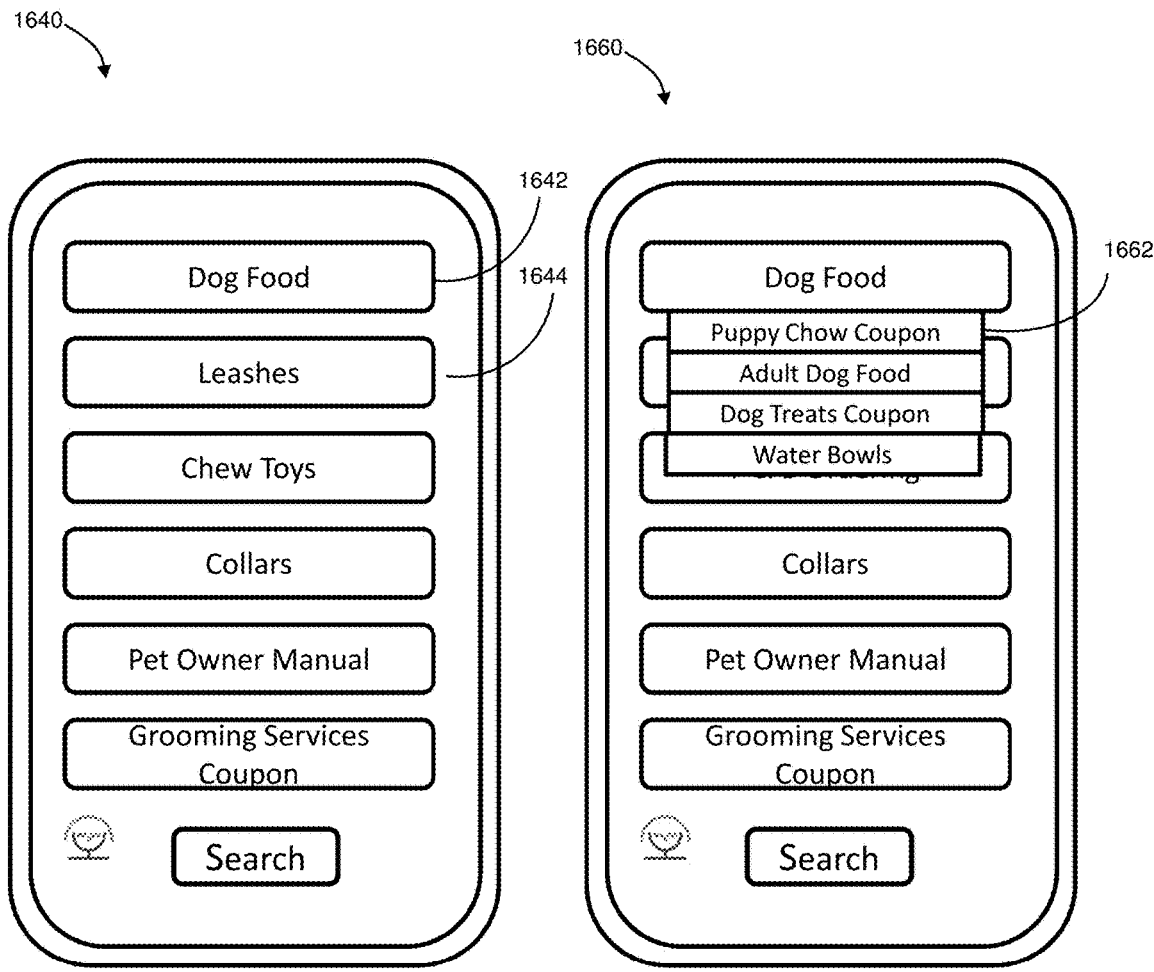

In FIG. 16C, an illustrative MADGUI presented to a user later in the day is shown. The content administrator has specified that content items such as Dog Food 1642 and Leashes 1644 should be shown to the user.

In FIG. 16D, an illustrative MADGUI with submenu deployed is shown. As a result of the user selecting item 1642, "Dog Food," a submenu 1662 has been deployed. Because the user 12345678 has expressed an interest in dogs, content item Dog Food may be delivered to the user's wireless handset due to the content connection established as shown in FIG. 13A. The user may also receive the content item "Puppy Chow Coupon" due to the content connection established as shown in FIG. 13B. The user may also receive the content item Puppy Chow Coupon if the user's wireless handset detects that the user is in the content bubble corresponding to the Pet Store due to the content connection established as shown in FIG. 14. Whether the user will receive the content item may depend on factors such as the relevance weighting for the content item relative to other content items which match the user's attributes. As FIG. 16D indicates, the user has received the content item Dog Food. The level 1 content item Dog Food was established as the parent of level 2 content item Puppy Show Coupon as shown in FIG. 16D. Puppy Chow Coupon appears as a content item in submenu 1662 after the parent content item Dog Food is selected.

All applications described above, including the LPE, MADGUI, content administration interfaces, content delivery application, and user interfaces, may be run from the OS, a browser, a browser plug-in, a native application, a JAVA applet, or a local software module.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for determining an indoor location of a wireless device and delivering content associated with an indoor geofence, the system comprising:
   a plurality of beacons, in which each beacon transmits a beacon identifier;
   at least one sensor that captures a plurality of sensor fingerprints, wherein each sensor fingerprint includes at least one sensor captured beacon identifier and at least one sensor captured beacon signal strength for each beacon detected by the sensor;
   the sensor having a fixed location;
   a plurality of beacon signal data captured by the wireless device, wherein the beacon signal data includes the beacon identifier and a corresponding wireless device beacon signal strength;
   a location positioning module that receives the sensor fingerprints captured by the sensor and the beacon signal data captured by the wireless device;
   the location positioning module uses the sensor fingerprints to generate a plurality of calculated signal strength values for at least one beacon, wherein some of the calculated signals are associated with the indoor geofence;
   the location positioning module determines the location of the wireless device by comparing the beacon signal data captured by the wireless device with the plurality of calculated signal strength values; and
   at least one content item displayed in the wireless device, when the wireless device enters, exits or is within the indoor geofence.

2. The system of claim 1, wherein a kriging algorithm is used to generate the calculated signal strength values.

3. The system of claim 2, wherein a K-nearest neighbor algorithm is used to select at least one calculated signal strength value, which is used to determine the location of the wireless handset.

4. The system of claim 1 wherein the content item is associated with at least one user attribute, which is further associated with the wireless device.

5. The system of claim 1 wherein the content item is associated with at least one time range and the content item is displayed within the time range on the wireless device.

6. The system of claim 1 wherein the content item is a link to another content item.

7. The system of claim 1 wherein the content item is an application.

8. A system for determining an indoor location of a wireless device and delivering content associated with an indoor geofence, the system comprising:
- a plurality of beacons, in which each beacon transmits a beacon identifier;
- at least one sensor that captures a plurality of sensor fingerprints, wherein each sensor fingerprint includes at least one sensor captured beacon identifier and at least one sensor captured beacon signal strength for each beacon detected by the sensor;
- the sensor having a fixed location;
- a beacon mode associated with the sensor, wherein the sensor includes a beacon sensor that transmits a beacon sensor identifier;
- a plurality of beacon signal data captured by the wireless device, wherein the beacon signal data includes the beacon identifier and a corresponding wireless device beacon signal strength, the beacon sensor identifier and a corresponding a beacon sensor signal strength;
- a location positioning module that receives the sensor fingerprints captured by the sensor and the beacon signal data captured by the wireless device;
- the location positioning module uses the sensor fingerprints to generate a plurality of calculated signal strength values for at least one beacon, wherein some of the calculated signals are associated with the indoor geofence;
- the location positioning module determines the location of the wireless device by comparing the beacon signal data captured by the wireless device with the plurality of calculated signal strength values; and
- at least one content item displayed in the wireless device, when the wireless device enters, exits or is within the indoor geofence.

9. The system of claim 8, wherein a kriging algorithm is used to generate the calculated signal strength values.

10. The system of claim 9, wherein a K-nearest neighbor algorithm is used to select at least one calculated signal strength value, which is used to determine the location of the wireless handset.

11. The system of claim 9 wherein the content item is associated with at least one user attribute, which is further associated with the wireless device.

12. The system of claim 9 wherein the content item is associated with at least one time range and the content item is displayed within the time range on the wireless device.

13. The system of claim 9 wherein the content item is a link to another content item.

14. The system of claim 9 wherein the content item is an application.

15. A method for determining an indoor location of a wireless device and delivering content associated with an indoor geofence, the method comprising:
- transmitting a beacon identifier for each beacon;
- capturing a plurality of sensor fingerprints with at least one sensor, wherein each sensor fingerprint includes at least one sensor captured beacon identifier and at least one sensor captured beacon signal strength for each beacon detected by the sensor;
- associating the sensor with a fixed location;
- capturing a plurality of beacon signal data with the wireless device, wherein the beacon signal data includes the beacon identifier and a corresponding wireless device beacon signal strength;
- receiving the sensor fingerprints captured by the sensor and the beacon signal data captured by the wireless device with a location positioning module;
- enabling the location positioning module to use the sensor fingerprints to generate a plurality of calculated signal strength values for at least one beacon, wherein some of the calculated signals are associated with the indoor geofence;
- determining the location of the wireless device by comparing the beacon signal data captured by the wireless device with the plurality of calculated signal strength values; and
- displaying at least one content item on the wireless device, when the wireless device enters, exits or is within the indoor geofence.

16. The method of claim 15, wherein a kriging algorithm is used to generate the calculated signal strength values.

17. The method of claim 16, wherein a K-nearest neighbor algorithm is used to select at least one calculated signal strength value, which is used to determine the location of the wireless handset.

18. The method of claim 15 wherein the content item is associated with at least one user attribute, which is further associated with the wireless device.

19. The method of claim 15 wherein the content item is associated with at least one time range and the content item is displayed within the time range on the wireless device.

20. The method of claim 15 wherein the content item is a link to another content item.

21. The method of claim 15 wherein the content item is an application.

* * * * *